(12) United States Patent
Malewicz

(10) Patent No.: US 11,361,361 B2
(45) Date of Patent: Jun. 14, 2022

(54) METHOD AND AN APPARATUS FOR SEARCHING OR COMPARING SITES USING ROUTES OR ROUTE LENGTHS BETWEEN SITES AND PLACES WITHIN A TRANSPORTATION SYSTEM

(71) Applicant: Grzegorz Malewicz, Kielce (PL)

(72) Inventor: Grzegorz Malewicz, Kielce (PL)

( * ) Notice: Subject to any disclaimer, the term of this patent is extended or adjusted under 35 U.S.C. 154(b) by 359 days.

(21) Appl. No.: 16/274,242

(22) Filed: Feb. 13, 2019

(65) Prior Publication Data

US 2019/0259082 A1    Aug. 22, 2019

Related U.S. Application Data

(60) Provisional application No. 62/800,428, filed on Feb. 2, 2019, provisional application No. 62/758,710, filed
(Continued)

(51) Int. Cl.
*G06Q 50/16* (2012.01)
*G01C 21/34* (2006.01)
(Continued)

(52) U.S. Cl.
CPC ......... *G06Q 30/0629* (2013.01); *G01C 21/34* (2013.01); *G06F 16/29* (2019.01);
(Continued)

(58) Field of Classification Search
CPC .... G06Q 30/0629; G06Q 50/16; G06Q 10/02; G06Q 10/047; G06Q 30/0201;
(Continued)

(56) References Cited

U.S. PATENT DOCUMENTS

| 5,502,640 A | * | 3/1996 | Yagyu | ................ | G01C 21/3446 |
| | | | | | 73/178 R |
| 5,559,707 A | * | 9/1996 | DeLorme | ........... | G01C 21/3688 |
| | | | | | 701/426 |

(Continued)

OTHER PUBLICATIONS

Bast, Hannah et al. "Route Planning in Transportation Networks" retrieved from the Internet on Jun. 17, 2019 under the link https://arxiv.org/pdf/1504.05140.pdf.
(Continued)

*Primary Examiner* — Luis A Martinez Borrero
(74) *Attorney, Agent, or Firm* — Grzegorz Malewicz

(57) ABSTRACT

Embodiments relate to searching or comparing sites. One embodiment is a real estate search-or-compare method based on commute durations. The method efficiently processes public transportation and real estate property data to compute the durations of travel between the real estate properties and the vehicle stops. These durations are stored. A request framework is introduced that allows to express a wide range of search-or-compare requests. During request processing, the method identifies parts of the commute paths that depend on any real estate property. Because durations for these parts were precomputed and stored, the method can determine commute durations to every real estate property in a scalable manner. As a result, the method rapidly responds to requests within the real estate market of one of the largest metropolitan areas in existence today. Other embodiments include: searching or comparing based on a monetary cost, transportation using private cars, and sites other than real estate properties. A computer system and a computer service also embody the method.

4 Claims, 12 Drawing Sheets

Related U.S. Application Data on Nov. 12, 2018, provisional application No. 62/780,268, filed on Dec. 16, 2018, provisional application No. 62/632,419, filed on Feb. 20, 2018.

(51) Int. Cl.
| | | |
|---|---|---|
| *G06Q 30/06* | (2012.01) | |
| *G06Q 50/30* | (2012.01) | |
| *G06Q 50/14* | (2012.01) | |
| *G06F 16/29* | (2019.01) | |

(52) U.S. Cl.
CPC ..... *G06Q 30/0631* (2013.01); *G06Q 30/0639* (2013.01); *G06Q 50/14* (2013.01); *G06Q 50/16* (2013.01); *G06Q 50/30* (2013.01)

(58) Field of Classification Search
CPC ........ G06Q 50/30; G06F 16/29; G01C 21/34; G01C 21/3423; G01C 21/20; G01C 21/36; G01C 21/32; G01C 21/367; G01C 21/3492; G01C 21/206; G01C 21/3617; G01C 21/3679; G01C 21/26
See application file for complete search history.

(56) References Cited

U.S. PATENT DOCUMENTS

| | | | | |
|---|---|---|---|---|
| 5,802,492 | A * | 9/1998 | DeLorme | G01C 21/3476 |
| | | | | 340/995.23 |
| 5,845,228 | A * | 12/1998 | Uekawa | G01C 21/3446 |
| | | | | 701/410 |
| 5,931,888 | A * | 8/1999 | Hiyokawa | G08G 1/096838 |
| | | | | 701/428 |
| 5,948,040 | A * | 9/1999 | DeLorme | G06Q 10/02 |
| | | | | 701/426 |
| 6,014,607 | A * | 1/2000 | Yagyu | G01C 21/3446 |
| | | | | 701/410 |
| 6,321,158 | B1 * | 11/2001 | DeLorme | G06Q 10/047 |
| | | | | 701/426 |
| 6,421,606 | B1 * | 7/2002 | Asai | G01C 21/3688 |
| | | | | 701/410 |
| 7,155,339 | B2 * | 12/2006 | Tu | G01C 21/34 |
| | | | | 701/426 |
| 7,463,972 | B2 * | 12/2008 | Yamada | G01C 21/3484 |
| | | | | 701/25 |
| 7,953,548 | B2 | 5/2011 | Vengroff et al. | |
| 8,175,793 | B2 * | 5/2012 | Stanton | G01C 21/3682 |
| | | | | 701/429 |
| 8,417,409 | B2 | 4/2013 | Bast et al. | |
| 8,738,286 | B2 | 5/2014 | Bast et al. | |
| 8,756,014 | B2 | 6/2014 | Bast et al. | |
| 8,898,015 | B2 * | 11/2014 | Tamai | G06N 5/003 |
| | | | | 701/527 |
| 8,924,147 | B2 | 12/2014 | Vellaikal et al. | |
| 9,140,570 | B1 * | 9/2015 | Baird | G01C 21/3682 |
| 9,195,953 | B2 * | 11/2015 | Borgerson | G06F 16/29 |
| 9,726,507 | B2 * | 8/2017 | Tanizaki | G01C 21/34 |
| 9,964,410 | B2 * | 5/2018 | Borgerson | G06F 16/29 |
| 10,094,675 | B2 * | 10/2018 | Hajj | G01C 21/3667 |
| 10,180,331 | B2 * | 1/2019 | Hajj | G01C 21/3423 |
| 10,197,409 | B2 * | 2/2019 | Pirwani | G06F 3/0488 |
| 10,317,219 | B1 * | 6/2019 | Borgerson | G01C 21/26 |
| 10,401,180 | B2 * | 9/2019 | Pirwani | G06F 3/0485 |
| 10,533,865 | B2 * | 1/2020 | Hajj | G06F 3/0488 |
| 10,712,162 | B2 * | 7/2020 | Malewicz | G01C 21/3423 |
| 10,845,199 | B2 * | 11/2020 | Pung | G01C 21/206 |
| 11,204,252 | B2 * | 12/2021 | Malewicz | G01C 21/3673 |
| 2004/0260465 | A1 * | 12/2004 | Tu | G01C 21/34 |
| | | | | 701/426 |
| 2006/0241857 | A1 | 10/2006 | Onishi et al. | |
| 2006/0271279 | A1 | 11/2006 | Kwak | |
| 2008/0021639 | A1 * | 1/2008 | Inukai | G08G 1/096866 |
| | | | | 701/533 |
| 2008/0215237 | A1 * | 9/2008 | Perry | G01C 21/3484 |
| | | | | 701/533 |
| 2009/0005965 | A1 * | 1/2009 | Forstall | G01C 21/3484 |
| | | | | 701/533 |
| 2009/0171980 | A1 * | 7/2009 | Meadow | G06F 16/51 |
| 2010/0211303 | A1 * | 8/2010 | Stanton | G01C 21/3682 |
| | | | | 701/532 |
| 2010/0211305 | A1 * | 8/2010 | Miyata | G01C 21/32 |
| | | | | 701/532 |
| 2010/0287207 | A1 * | 11/2010 | Motoyama | G06F 16/29 |
| | | | | 707/804 |
| 2011/0112759 | A1 | 5/2011 | Bast et al. | |
| 2011/0251789 | A1 | 10/2011 | Sanders et al. | |
| 2012/0179674 | A1 * | 7/2012 | Celling | G06F 16/29 |
| | | | | 707/E17.011 |
| 2012/0209524 | A1 | 8/2012 | Okude et al. | |
| 2012/0283948 | A1 * | 11/2012 | Demiryurek | G01C 21/3492 |
| | | | | 701/533 |
| 2013/0046795 | A1 * | 2/2013 | Borgerson | G06Q 10/06 |
| | | | | 707/E17.011 |
| 2013/0197794 | A1 | 8/2013 | Bast et al. | |
| 2013/0238240 | A1 * | 9/2013 | Tamai | G01C 21/34 |
| | | | | 701/527 |
| 2014/0107921 | A1 | 4/2014 | Delling et al. | |
| 2014/0195153 | A1 * | 7/2014 | Barrett | G01C 21/3682 |
| | | | | 701/516 |
| 2014/0358439 | A1 * | 12/2014 | Jamain | G06F 3/048 |
| | | | | 701/538 |
| 2015/0006076 | A1 * | 1/2015 | Guo | H04W 4/024 |
| | | | | 701/533 |
| 2015/0377637 | A1 * | 12/2015 | Tanizaki | G08G 1/096838 |
| | | | | 701/533 |
| 2016/0003637 | A1 * | 1/2016 | Andersen | H04L 12/1827 |
| | | | | 701/519 |
| 2016/0216122 | A1 * | 7/2016 | Borgerson | G01C 21/26 |
| 2016/0321302 | A1 * | 11/2016 | Flynn | G06F 16/29 |
| 2016/0356603 | A1 * | 12/2016 | Hajj | G06F 3/0485 |
| 2016/0356613 | A1 * | 12/2016 | Hajj | G06F 3/0488 |
| 2016/0356617 | A1 * | 12/2016 | Verosub | G01C 21/3694 |
| 2016/0358469 | A1 * | 12/2016 | Pirwani | G01C 21/3423 |
| 2016/0358470 | A1 * | 12/2016 | Pirwani | G01C 21/20 |
| 2016/0358471 | A1 * | 12/2016 | Hajj | G06F 3/0488 |
| 2017/0356742 | A1 * | 12/2017 | Pung | G01C 21/206 |
| 2018/0224293 | A1 * | 8/2018 | Xu | G01C 21/30 |
| 2018/0232824 | A1 | 8/2018 | Kang et al. | |
| 2019/0094033 | A1 * | 3/2019 | Hajj | G01C 21/3667 |
| 2019/0101400 | A1 * | 4/2019 | Pirwani | G08G 1/0125 |
| 2019/0113356 | A1 * | 4/2019 | Fowe | G01C 21/3407 |
| 2019/0195639 | A1 * | 6/2019 | Malewicz | G01C 21/3492 |
| 2020/0088532 | A1 * | 3/2020 | Hajj | G01C 21/3667 |
| 2020/0300642 | A1 * | 9/2020 | Malewicz | G06Q 10/047 |
| 2020/0348141 | A1 * | 11/2020 | Malewicz | G01C 21/3423 |
| 2020/0349660 | A1 * | 11/2020 | Malewicz | G06F 16/9537 |
| 2021/0215500 | A1 * | 7/2021 | Malewicz | G06F 16/29 |
| 2021/0374824 | A1 * | 12/2021 | Malewicz | G06Q 30/0631 |

OTHER PUBLICATIONS

Stefanescu, Patrick et al. "Trip used in public transportation." Case study on the city of Timisoara; retrieved from the Internet on Jun. 17, 2019 under the link https://reader.elsevier.com/reader/sd/pii/S1877042814020187?token=75CAFFDE1CC785E2BD7BC155AE6F9A93A4B9932F401E3F925553766D394ADD83A1A109FBA014BF1C9C30B4120.

* cited by examiner

FIG. 10

```
vector home_cluster_durations;
CoordinatewiseSetInfinity(home_cluster_durations);

limit_meters = 2000;

// Travel and walk.
vector stopstation_clusters;
vector walk_seconds;
(stopstation_clusters, walk_seconds) =
    storage.geo_walks.WalksFromStopstationClustersTo(
        W, limit_meters);
for i = 1 to stopstation_clusters.size() {
   stopstation_cluster = stopstation_clusters[i];
   walk_second = walk_seconds[i];

vector home_cluster_seconds =
      storage.shortest_paths.HomeClusterSecondsToStopstationCluster(
         stopstation_cluster);
   // Dense vector operation.
   for j = 1 to home_cluster_seconds.size() {
      home_cluster_durations[j] =
         min(
            home_cluster_durations[j],
            home_cluster_seconds[j] + walk_second);
   }
}

// Direct walk.
vector home_clusters;
(home_clusters, walk_seconds) =
    storage.geo_walks.WalksFromHomeClustersTo(W, limit_meters);
// Sparse vector operation.
for i = 1 to home_clusters.size() {
   home_cluster = home_clusters[i];
   walk_second = walk_seconds[i];
   home_cluster_durations[home_cluster] =
      min(
         home_cluster_durations[home_cluster],
         walk_second);
} return home_cluster_durations;
```

METHOD AND AN APPARATUS FOR SEARCHING OR COMPARING SITES USING ROUTES OR ROUTE LENGTHS BETWEEN SITES AND PLACES WITHIN A TRANSPORTATION SYSTEM

CROSS-REFERENCE TO RELATED APPLICATIONS

This application is based upon, and claims the priority dates of, applications:

| [Country] | [Application Number] | [Filing Date] |
|---|---|---|
| USA | 62/632,419 | Feb. 20, 2018 |
| USA | 62/758,710 | Nov. 12, 2018 |
| USA | 62/780,268 | Dec. 16, 2018 |
| USA | 62/800,428 | Feb. 2, 2019, | which are incorporated herein by reference.

BACKGROUND OF THE INVENTION

The present invention relates to searching or comparing sites. A traditional goal of searching is to find a site, from among a range of possible alternatives, that achieves an optimization objective, such as minimize a route length given specific travel requirements and desired features of the sought site. For example, when searching for real estate properties given required destinations of commutes and real estate property features, a goal may be to enumerate real estate properties with matching features that have the shortest commute durations. Other goal may be to compare any real estate properties using commute durations.

BRIEF SUMMARY OF THE INVENTION

Embodiments include a method for searching or comparing sites, a computer system that implements and executes the method, and a computer service that receives search or compare requests from users and responds with site and route information.

According to an embodiment of the present invention, a method for searching or comparing sites using routes or route lengths is provided. The method uses extensive preprocessing to precompute and store in a database routes or route lengths between each site and representatives within a transportation system. The method introduces a search-or-compare framework for sites. When a request containing a route specification is received, precomputed data is retrieved from the database to rapidly compute a route or a route length for each site. Sites may be searched or compared using routes or route lengths.

According to an embodiment of the present invention, a computer system for searching or comparing sites using routes or route lengths is provided. The system is a combination of hardware and software. It obtains data about a transportation system and sites from one or more data providers. The system builds graphs that model travel between the sites and representatives within the transportation system. The system computes graph paths, and stores graph paths or graph path lengths. This enables to quickly compute routes or route lengths for every site when a request is received, and search or compare sites using routes or route lengths.

According to an embodiment of the present invention, a computer service for searching or comparing sites using routes or route lengths is provided. The service allows the user to specify a search or compare request through a User Interface on a device, for example a smartphone. The request contains a route specification and a filtering condition. In response, the service presents sites that match the filtering condition along with routes or route lengths for the matched sites, or the service compares sites using routes or route lengths.

It is fundamentally necessary to quickly compute a route length for each site. We sketch a mathematical proof. Consider any search-or-compare method $\mathcal{M}$. We can design an adversarial request that will force $\mathcal{M}$ to respond with any given ordered list of sites. The adversary has two mechanisms at its disposal: (1) provide a request with a route specification that creates an order of sites with respect to the route length, the order selected by the adversary, and (2) provide a request with a filtering condition on sites that matches a subset of sites that is selected by the adversary. Thus the $\mathcal{M}$ must respond with an ordered list of sites arbitrarily selected by the adversary at request time. Details of the proof sketch are outside of the scope of a patent application.

The method, the computer system, and the computer service each jointly performs tasks that are not simply generic nor well-understood by prior art. Prior art includes: U.S. Pat. No. 8,417,409 B2; continuation U.S. Pat. No. 8,738,286 B2; division U.S. Pat. No. 8,756,014 B2; KR 10-1692501 B1; continuation PCT/KR2016/01083; WO 2017/065431 A1; US 2018/0232824 A1; and KR 10-1905593 B1.

The embodiments of the invention presented here are for illustrative purpose; they are not intended to be exhaustive. Many modifications and variations will be apparent to those of ordinary skill in the art without departing from the scope and spirit of the embodiments.

In the presentation, the terms "the first", "the second", "the", and similar, are not used in any limiting sense, but for the purpose of distinguishing, unless otherwise is clear from the context. An expression in a singular form includes the plural form, unless otherwise is clear from the context. The terms "having", "including", "comprising", and similar, indicate an existence of components or features, and do not preclude other components or features from existing or being added.

BRIEF DESCRIPTION OF DRAWINGS

The drawings included in the invention disclosure exemplify various features and advantages of the embodiments of the invention:

FIG. 10: depicts an example pseudocode for computing the shortest travel duration at the start of a commute path according to an embodiment of the invention, legend: "An example pseudocode for computing PathFromHomeDurations($\rightarrow W$).";

Figure 1:
FIG. 1: depicts an example color rendering of travel durations of commute paths according to an embodiment of the invention, legend: "An example color rendering of travel durations of commute paths for real estate properties with two commute paths: property→geo.0.0→geo.0.1→property, and property→geo.1.0→property. We used a map tile engine by Google, any other may be used instead."

The drawings are for illustrative purpose only. Other drawings can exemplify the invention without departing from the principles of the invention, as will be readily recognized by one of ordinary skill in the art.

DETAILED DESCRIPTION OF THE INVENTION

4. Detailed Description

The invention concerns a general case of searching or comparing arbitrary sites using an arbitrary optimization objective that uses routes or route lengths to arbitrary places. However, for the sake of ease of presentation, we first illustrate the invention through specific sites that are real estate properties, specific places that are workplaces, and a specific optimization objective of minimizing travel durations of commutes between real estate properties and workplaces. This illustration is not limiting. In later sections, we explain how the method works in the general case.

4.1 Real Estate Properties and Commute Paths

Finding a home is a complex endeavor. People spend a significant effort of time and money on a search. Technology has come to help, however. There are several services available online that aggregate real estate property listings, and allow people to search for real estate properties with specific features, for example a price, a geographical location, a number of bedrooms, and so on, in the convenience of a web browser or a smartphone. This search yields a shortlist that the person then typically inspects in flesh.

Location is arguably the most important feature of any real estate property, as attested by the "location, location, location" slogan of real estate agents. Our invention concerns this feature.

Residents need to commute to work, school, or other places. The travel durations of these commutes bear on the value of the real estate property personalized for its specific residents. In addition, there is much global economic value in reducing the travel durations for all residents of a metropolitan area, in terms of time that can be allocated to more productive activities, energy that does not need to be spent on moving people around, etc. Our invention helps deliver these personal and global values.

As a simple illustration, consider a family of two who live in the capital of South Korea. One person is a government employee at the City Hall, and the other person is a librarian at the Main Library of Seoul National University. They currently live in a two-bedroom one-bathroom apartment of size 69 square meters that requires a deposit payment of 350,000,000 KRW. The apartment is near latitude and longitude (37.5333, 127.0746). Their combined daily roundtrip commute lasts 1 h 41 m (about 25 minutes each way, on average). However, it turns out that they can decrease the travel duration to just 1 h 16 m (25 minutes savings) after moving to an apartment with the same features, but located near (37.5041, 126.8888). The shortest travel duration for any apartment is 50 minutes. However, that apartment has other price and size. (Illustration as of Feb. 19, 2018.)

Why is it hard to deliver these improvements for all? A naive approach is to consider every real estate property available on the market that has the size and other features required by the family, and, given the work places, compute the travel durations by querying any existing online routing engine. This approach does not scale, however. One problem is the high number of real estate properties available on the market in a modern metropolitan area. Other problem is the high number of families/users who may want to seek improvements. Even if we assume that we can query a routing engine cheaply, the quadratic nature of the problem still makes the queries expensive in aggregate.

How can we deliver these improvements for all? Our invention explains. It includes the following components:
1. The invention defines a model for a commute path. The model is versatile to cover a wide range of commute paths that occur in practice, for example going to school, then to a piano class, and then returning home. The utility of our model is enhanced by our ability to quickly find real estate properties that minimize travel durations.
2. The invention teaches an optimization method that rapidly computes travel durations. The invention identifies the parts of any commute path that are dependent on any real estate property. Travel durations for these parts are precomputed and stored. As a result, when travel durations need to be found for a commute path, the invention can rapidly assemble time parts to produce a travel duration for every real estate property.

3. An embodiment of the invention is a live computer service. The service enables the 25 million residents of the Seoul Metropolitan Area to search or compare real estate properties using travel durations.

4.2 Method Outline

We use the term travel in a broad sense that includes moving objects or data. A description of travel is anything that a person of ordinary skill in the art would name so. Here are some examples of a description of travel: (1) "hey buddy, you need to go one block north, and then turn slightly left", and (2) "5 dollars". We may use a term travel path when we mean a description of travel. A length of travel is a numeric value that a person of ordinary skill in the art can associate with travel, for example a distance, a monetary cost, etc. As other example, we may use a term travel duration when we mean a length of travel that represents time. A length of travel is by itself a description of travel. A description of travel: may not include any length of travel, may include only a length of travel, or may also include some other data.

We illustrate some capabilities of the method and introduce terminology subsequently used. The method can compute travel durations of commute paths for every real estate property. FIG. 1 illustrates this. The metropolitan area is colored with squares. The colors represent how long it takes to commute from a real estate property in each specific area using public transportation: green means short commute, yellow longer, and red longest. A commute path will start at a property, then visit specific places geo, . . . , and finally return to the property. In a sense the property is a free variable, while the geo, . . . are fixed. In FIG. 1, there are two commute paths: an "open-jaw" commute path property→geo.0.0→geo.0.1→property twice per week, and a "roundtrip" commute path property→geo.1.0→property three times per week. We can see that given these two commute paths and their frequencies, the real estate properties with small weighted sum of shortest travel durations form an irregular patch (dark green), which may not come as a surprise, given possibly intricate public transportation routes.

Figure 2:
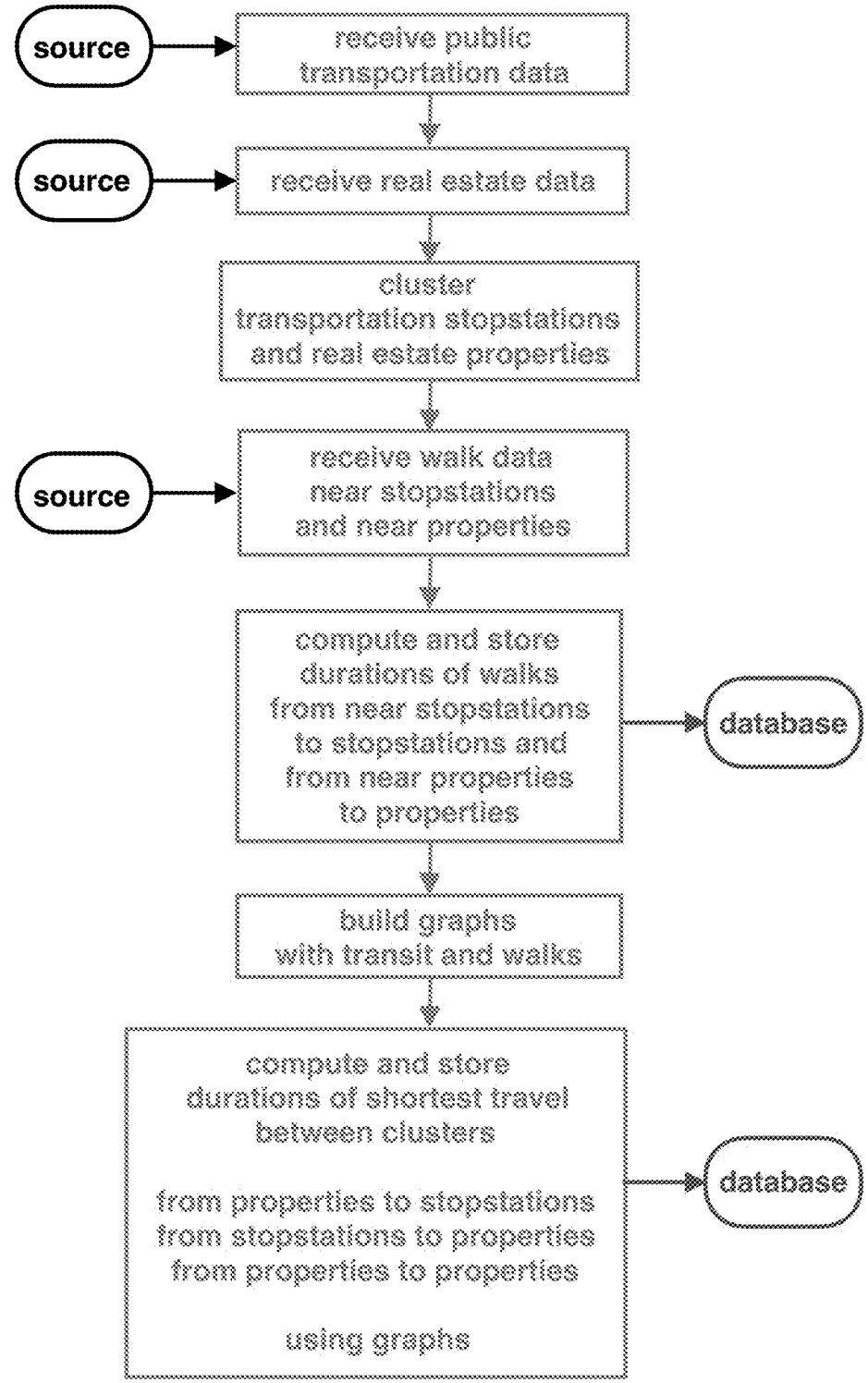
FIG. 2: depicts an example process flow of preprocessing and storing of data according to an embodiment of the invention, legend: "An example process flow of preprocessing and storing of data."
Figure 3:
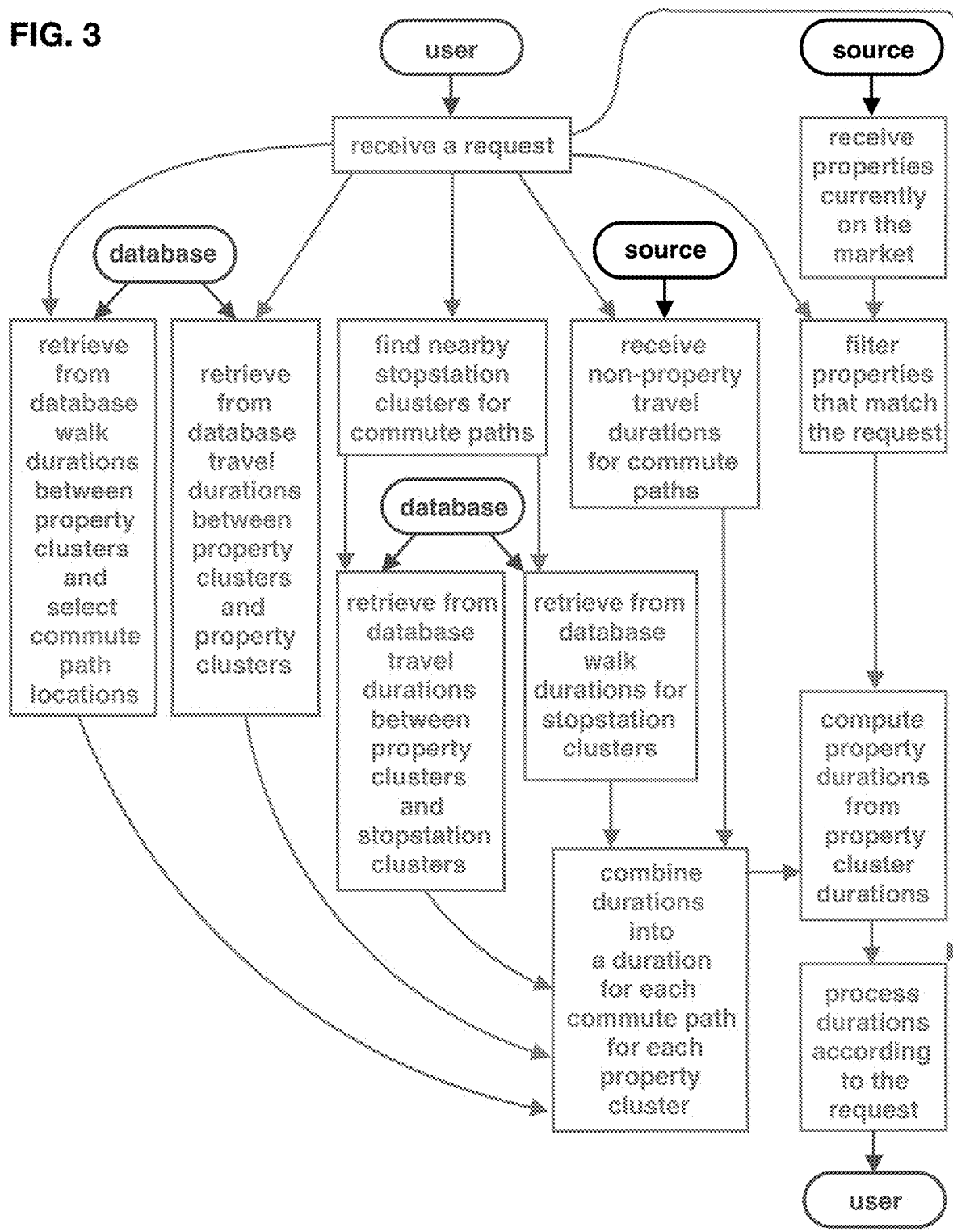
FIG. 3: depicts an example process flow of responding to a request using preprocessed stored data according to an embodiment of the invention, legend: "An example process flow of responding to a request using preprocessed stored data."

At a high level, the method is composed of two parts. The first part computes travel durations between real estate properties and representatives that are vehicle stops of a transportation system. These travel durations are stored in a database, so that they can be readily retrieved when a request is received. See FIG. 2 for an illustration. The second part processes requests. A request contains a commute path and desired features of a real estate property. When a request is received, appropriate travel durations are retrieved from the database, and used together with other data to produce a travel duration for the commute path for every real estate property that has the desired features. See FIG. 3 for an illustration. Details and variants of this outline are described in subsequent sections.

4.3 Commute Paths

Our method handles a broad range of commutes that people perform within a metropolitan area. A commute starts at a site H that we call a home. The H is an arbitrary location. It can be any real estate property, for example an apartment, a rented room, a house with a garden, a ranch, a hotel, etc. It can also be a site where a person works, a restaurant, a shop, etc. However, as a naming convention, we use the phrase "home" in most of the disclosure; this convention is not limiting. In one embodiment, a commuter travels to various places, and then returns to the site H.

In one embodiment, a commute lasts within one day, for example a commuter departs from H in the morning and returns back to H in the evening of the same day. In other embodiment, a commute lasts within more than one day, for example if a person works a night shift, or has a work shift of 25 hours. In one embodiment, any travel may start at a specific time, or may end at a specific time, for example 8:12 AM. In other embodiment, any travel may begin, or end, within a range of time, for example "in the morning".

In a simplest form, a commuter travels from H to a place W, that we call work. The W is an arbitrary location. It includes a school, a grandparents home, a weekend golf course, a favorite restaurant, a doctor's office, a place of worship, etc. It can also be a place where a person lives. However, as a naming convention, we use the phrase "work" in most of the disclosure; this convention is not limiting. Then the commuter returns from W to H. We call these two travels a roundtrip commute path. See FIG. 4A for an illustration.

An open-jaw commute path is an example of a more complex commute. See FIG. 4B for an illustration. Here the commuter travels from H to a place $W_1$. Then the commuter travels from the place $W_1$ to other place $W_2$. Finally, the commuter travels from the place $W_2$ back to the site H. One example is when a person travels to a school and then to a piano class.

Figure 4:
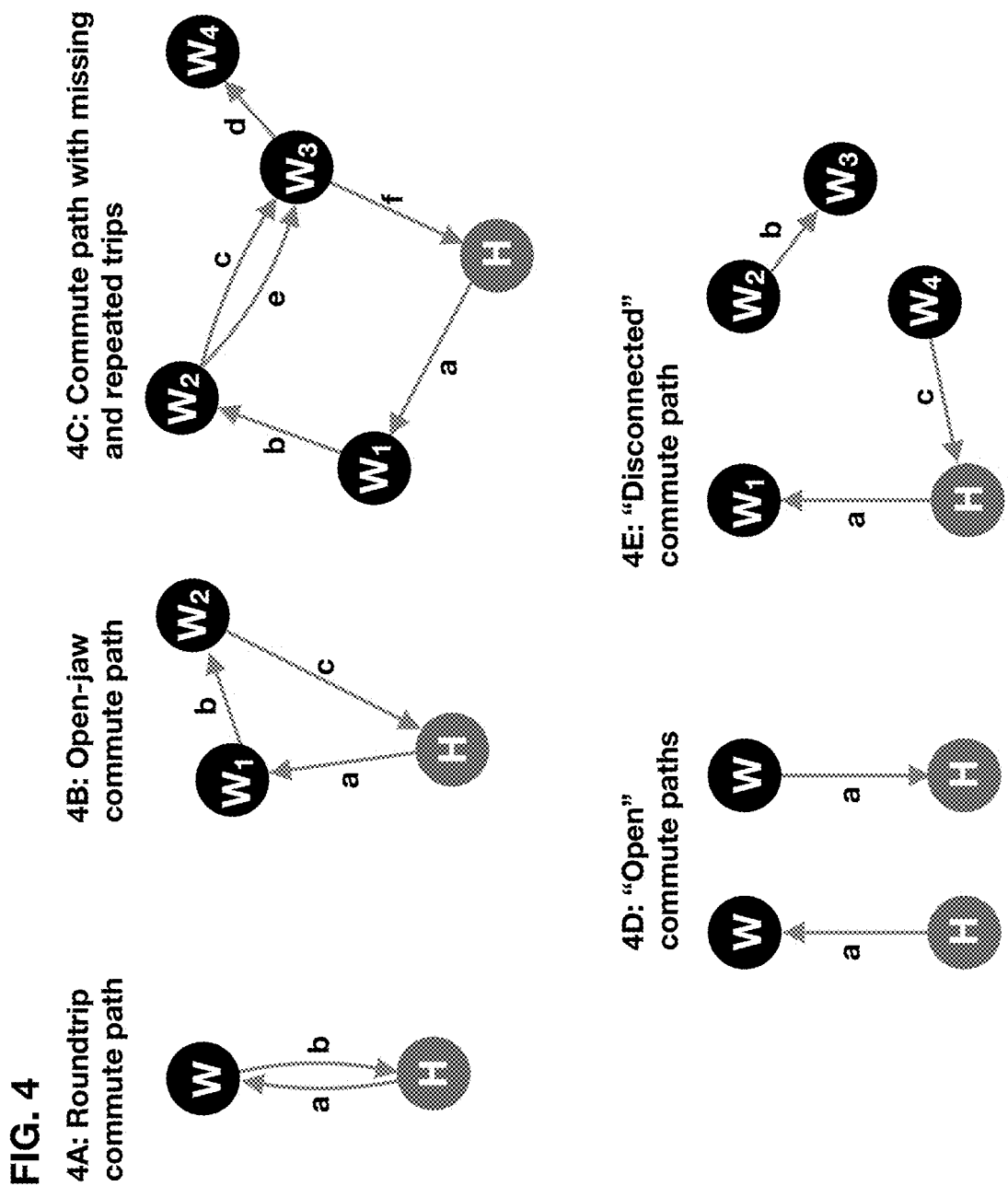
FIG. 4: depicts example commute paths according to an embodiment of the invention, legend: "Example commute paths."

In general, our method allows for arbitrary travels. In FIG. 4C, we see an illustration of a commute path with a missing travel from $W_4$ to $W_2$, and a repeated travel from $W_2$ to $W_3$. In FIG. 4D, we see illustrations of "open" commute paths: a commute path that departs from H, but does not return to H; and a commute path that returns to H, without previously departing form H. In FIG. 4E, we see an illustration of a "disconnected" commute path. A commute path could start at a home, but end at other home. Our method defines a commute path as follows.

Definition 1 A commute path is a collection of travels $W_2 \rightarrow W_3 \rightarrow W_4 \rightarrow W_5, \ldots, W_{k-2} \rightarrow W_{k-1}$, for $k \geq 2$ that is even, together with $H_{first} \rightarrow W_1$ or $W_k \rightarrow H_{last}$ (so a commute path always contains at least one home and at least one work), that occur at arbitrarily moments of time.

A commute path can be viewed as a specification of a route within a transportation system. The various W and H in Definition 1 specify where the commuter wishes to travel.

In one embodiment, we consider a simpler commute path $H \rightarrow W_1 \rightarrow W_2 \rightarrow \ldots \rightarrow W_k \rightarrow H$, for any $k \geq 1$, that has shared endpoints between travels, and the same home at the start and the end. We use this simpler form in most of the disclosure, because it is common in practice and simplifies our presentation. However, it will be obvious to anyone of ordinary skill in the art that our method applies to our (general) definition of a commute path.

Our method finds a shortest travel duration along any commute path. This by itself has been addressed by various prior art. However, our method finds travel durations for all homes in a dramatically reduced amount of time.

4.4 Preprocessing of Transportation System

The method preprocesses data about public transportation system, so as to precompute and store shortest travel for all homes.

4.4.1 Computation of Shortest Travel

We describe a method for efficiently computing shortest travel between all homes, and all locations of public transportation stops. We call the stops stopstations in most of the disclosure, and they include bus stops, subway stations, or both.

The method starts with an arbitrary public transportation system graph GT that models a public transportation system, and that can be obtained from prior art. The graph may contain vertexes that represent bus stops, subway stations, or both. Other vertexes may exist in the graph, for example representing a stop or a turn of a vehicle, or a stop or a turn of a walk. Vertexes in the graph that correspond to stops of vehicles are denoted by STOPSTATION_$s$, indexed by s. There are directed weighted edges, each representing a travel duration along a segment from the source vertex of the edge to the target vertex of the edge. Other edges may exists in the graph. An edge may represent a transfer from one vehicle to other vehicle. The graph may contain data about departure times or arrival times of various public transportation vehicles. A Dijkstra's shortest graph paths algorithm, or an A* (A star) search algorithm, is commonly used to compute a graph path with a shortest graph path length (sum of weights), representing a shortest travel duration, from a STOPSTATION_$s'$ to other STOPSTATION_$s''$, for any s' and s'', also if travel starts at a specific time, or ends at a specific time.

Figure 5:
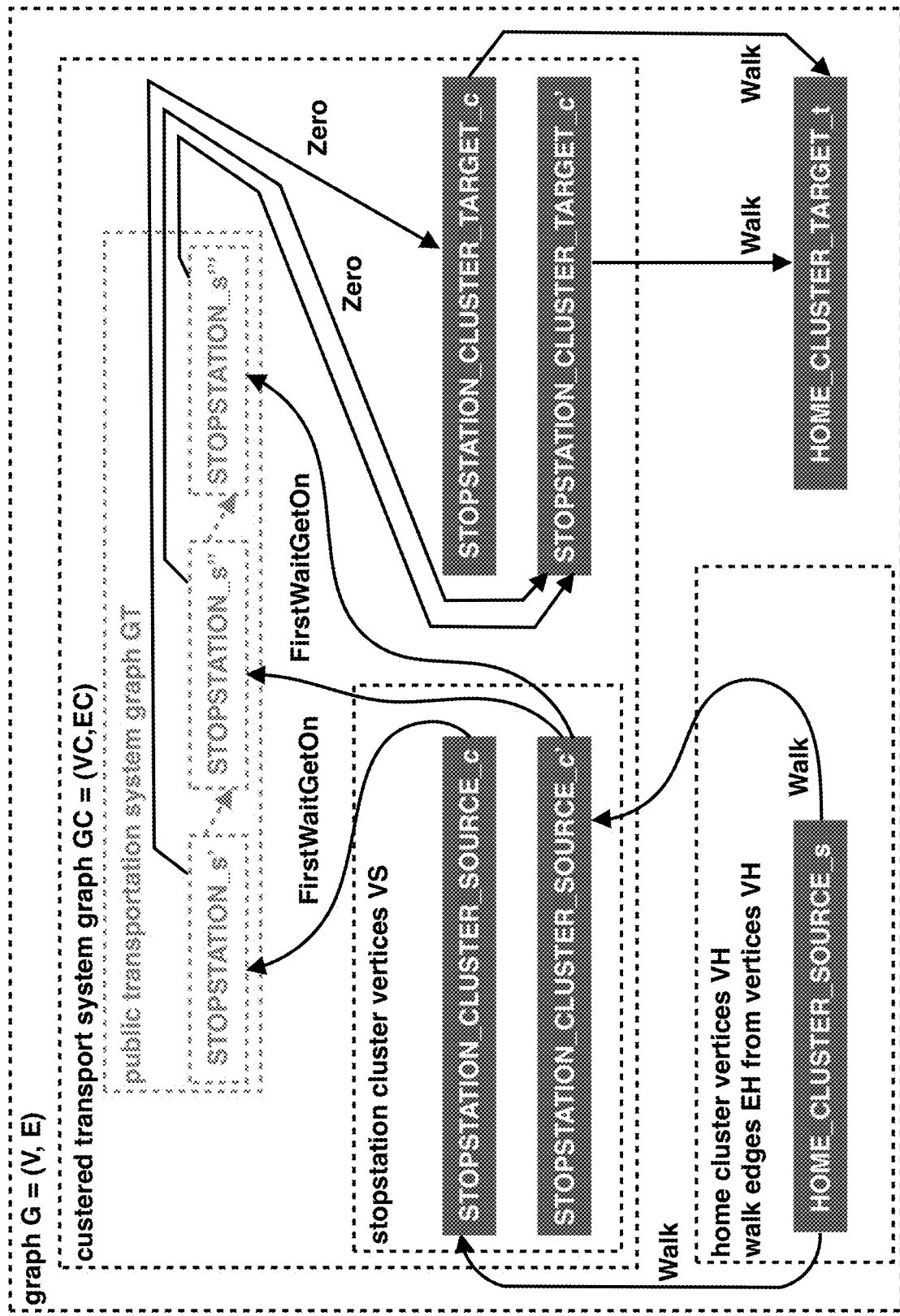
FIG. 5: depicts example extensions of a public transportation system graph for precomputing shortest graph paths according to an embodiment of the invention, legend: "Example public transportation system graph extensions for precomputing shortest graph paths."

Our method extends the public transportation system graph GT. See FIG. 5 for an illustration.

The first extension introduces clusters of stopstations. The method clusters stopstations using any clustering algorithm; in one embodiment the method puts two stopstations into one cluster when the geographical distance between the two stopstations is at most a threshold, for example 5 meters, or when a travel duration between the two stopstations is at most a threshold. We may refer to the location of a cluster, when we mean a geographical location within the cluster, for example the center of the cluster. For each stopstation cluster c, the method adds two vertexes STOPSTATION_CLUSTER_SOURCE_$c$ and STOPSTATION_CLUSTER_TARGET_$c$, and edges that connect the cluster with stopstations of GT STOPSTATION_CLUSTER_SOURCE_$c$→STOP-
STATION_$s'$ labeled FirstWaitGetOn, and STOPSTATION_$s'$→STOPSTATION_
CLUSTER_TARGET_$c$ labelled Zero, for any s', whenever s' is in cluster c. The edges have zero weight. The resulting graph is denoted by GC, having vertexes VC and edges EC. A subset of the vertexes STOPSTATION_CLUSTER_SOURCE_$c$, for all c, is denoted by VS.

The seconds extension introduces clusters of homes. The method clusters homes using any clustering algorithm; in one embodiment the method uses the same algorithm as when clustering stopstations. Similarly, we may refer to the location of a home cluster. For each home cluster s, the method adds a vertex HOME_CLUSTER_SOURCE_$s$ and a vertex HOME_CLUSTER_TARGET_$s$.

The method connects each home cluster to stopstation clusters using walks. Specifically, the method adds an edge HOME_CLUSTER_SOURCE_$s$→
STOPSTATION_CLUSTER_SOURCE_$c$ labelled Walk, if there is a walk from the location of the home cluster s to the location of the stopstation cluster c, for any s and c, with edge weight set to the duration of the walk; and a "reversed" edge STOPSTATION_CLUSTER_TARGET_$c$→
HOME_CLUSTER_TARGET_$t$ labelled Walk when there is a walk in the reverse direction from the location of the stopstation cluster c to the location of the home cluster t, for any c and t, with edge weight set to the duration of the walk. In one embodiment, the method limits walks to shortest walks at a specific speed, for example 4 km/h, lasting at most a threshold, for example 1 hour. The resulting graph is denoted by G. We denote by VH the set of vertexes HOME_CLUSTER_SOURCE_$s$, for all s; and denote by EH the set of edges HOME_CLUSTER_SOURCE_$s$→
STOPSTATION_CLUSTER_SOURCE_$c$, for all s and c.

We are interested in computing a shortest graph path from each stopstation cluster to each home cluster, and a shortest graph path in the reverse direction from each home cluster to each stopstation cluster.

We remark that clustering allows our method to significantly improve the performance of a shortest graph paths computation, by "unifying" locations that are essentially the same with respect to shortest graph paths. For example, in a tall apartment complex, there may be hundreds of homes, and our method will "unify" them into just one home cluster. Thus a shortest graph paths algorithm needs to compute shortest graph paths for just one home cluster, rather than for hundreds of constituent homes.

A standard application of a Dijkstra's algorithm still yields poor performance, however. That application runs the algorithm from each STOPSTATION_CLUSTER_SOURCE_$c$ in the G without any HOME_CLUSTER_SOURCE_$s$ vertexes, and then runs the algorithm from each HOME_CLUSTER_SOURCE_$s$ in the G without any HOME_CLUSTER_TARGET_$t$ vertexes. The combined asymptotic time complexity is $$O(|VS|\cdot(|EC|+|EH|+(|VC|+|VH|)\log(|VC|+|VH|)))+O$$
$$(|VH|\cdot(|EC|+|EH|+(|VC|+|VH|)\log(|VC|+|VH|))).$$

Our method improves on this standard application. We observe that in a large metropolitan area it is often the case that the number of home clusters is significantly larger than the number of stopstation clusters |VH|»|VS|, given the same clustering threshold. Utilizing this observation, our method uses a different algorithm for computing shortest graph paths from home clusters: the method reverses the edges of G, and for each STOPSTATION_CLUSTER_TARGET_$c$ in the reversed graph, computes shortest graph paths to all HOME_CLUSTER_SOURCE_$s$ vertexes using Dijkstra's algorithm (any HOME_CLUSTER_TARGET_$t$ vertexes can be removed). This yields the desired effect, because when we reverse the edges of any shortest graph path from STOPSTATION_CLUSTER_TARGET_$c$ to HOME_CLUSTER_SOURCE_$s$ in the reversed graph, we obtain a shortest graph path from HOME_CLUSTER_SOURCE_$s$ to STOPSTATION_CLUSTER_TARGET_$c$ in the original (not reversed) graph. Hence, the asymptotic time complexity of our method is just $$O(|VS|\cdot((|EC|+|EH|)+(|VC|+|VH|)\log(|VC|+|VH|))).$$

In practice, our method offers a significant reduction in the total running time on a graph G of the Seoul Metropolitan Area.

The method uses a symmetric algorithm in the opposite case when there are more stopstation clusters than home clusters |VH|<|VS|. In that case, the method reverses the edges when computing shortest graph paths from stopstation clusters to home clusters.

In one embodiment, the method uses departure times. The method computes shortest graph paths from each STOPSTATION_CLUSTER_SOURCE_$c$ to every HOME_CLUSTER_TARGET_$t$, for a given departure time from the STOPSTATION_CLUSTER_SOURCE_$c$.

In that case, the method uses an appropriate prior art graph GT that allows to specify the departure time from stops of public transportation vehicles; this case is sometimes represented using a vertex that corresponds to a time and a geographical location, and an edge that represents a travel duration starting from the geographical location at the time. Similarly, the method computes in the reversed graph based on a given arrival time at STOPSTATION_CLUSTER_TARGET_$c$.

Shortest graph path lengths convert these arrival times to the departure times from each HOME_CLUSTER_SOURCE_$s$.

A similar graph is used to compute shortest graph paths given an arrival deadline. An appropriately constructed graph can be used to compute a probability of arrival before a deadline.

In one embodiment, we do not extend GT with any vertexes

STOPSTATION_CLUSTER_SOURCE_$c$ nor any vertexes

STOPSTATION_CLUSTER_TARGET_$c$.

Instead, we connect any vertexes

HOME_CLUSTER_SOURCE_$s$ and any vertexes

HOME_CLUSTER_TARGET_$t$ by direct Walk edges with any vertexes

STOPSTATION_$s'$.

In one embodiment, we do not extend GT with any vertexes

HOME_CLUSTER_SOURCE_$s$ nor any vertexes

HOME_CLUSTER_TARGET_$t$.

Instead, we add vertexes

HOME_$s$, each representing a home, that we connect to any vertexes

STOPSTATION_$s'$ directly by Walk edges.

In one embodiment, we do not cluster homes.

In one embodiment, we do not cluster stopstations.

In one embodiment, we compute shortest graph paths given an arrival deadline: from stopstation clusters to home clusters given an arrival deadline at each home cluster, or from home clusters to stopstation clusters given an arrival deadline at each stopstation cluster.

In one embodiment, we use any shortest graph paths algorithm other than a Dijkstra's algorithm, for example an A* (A star) search algorithm. In one embodiment, we use an approximation algorithm for shortest graph paths. We may use an algorithm without any of the performance improvements.

In one embodiment, the weights on some graph edges represent monetary costs of travel, instead of travel durations. Then our method searches or compares homes based on the monetary cost of commute paths. Any other semantic of edge weights can be used, for example: a number of transfers among public transportation vehicles, a duration of wait, a monetary cost of wait, or a distance of travel.

In one embodiment, we apply a multi-objective optimization search based on a multi-dimensional cost. For example, we search for a shortest graph path whose length represents a travel duration, such that a monetary cost that represents the graph path is at most a threshold, or when a monetary cost is added as a penalty to the graph path length.

In one embodiment, a travel path is represented by a graph path. We compute various features of a shortest travel path using a shortest graph path, for example: the first (i.e., boarding) or the last (i.e., disembarking) stopstation of the shortest graph path, the main transit stopstation of the shortest graph path, the number of vehicle transfers, the vehicle where most time is spent during travel (for example bus 1234), the total wait time at stopstations, the total walk distance, whether the specific shortest graph path is typically congested during rush hours, or a sequence of geographical locations along the graph path. These features may be used during request processing to filter travel paths whose features match a condition specified in the request.

In one embodiment, we compute two or more graph paths between some graph vertexes. For example, one graph path from a vertex u to a vertex v could be with at most one bus, and other graph path from the vertex u to the vertex v could be without any subway, but no more than 10 minutes longer than a shortest graph path.

In one embodiment, we compute graph paths that match various filtering conditions. For example, graph paths that have at most one transfer, or at most a specific walk duration.

In one embodiment, we use a routing engine (for example prior art) to compute shortest travel between homes and public transportation stops. Thus we may sometimes not use the graphs described in the current Section 4.4.1.

The method described in Section 4.4.1 computes a shortest travel from each home to each stopstation, and a shortest travel in the reverse direction. Next we describe a data structure for efficient storage and processing of shortest travel data used by our method.

4.4.2 Storage of Shortest Travel

Figure 6:
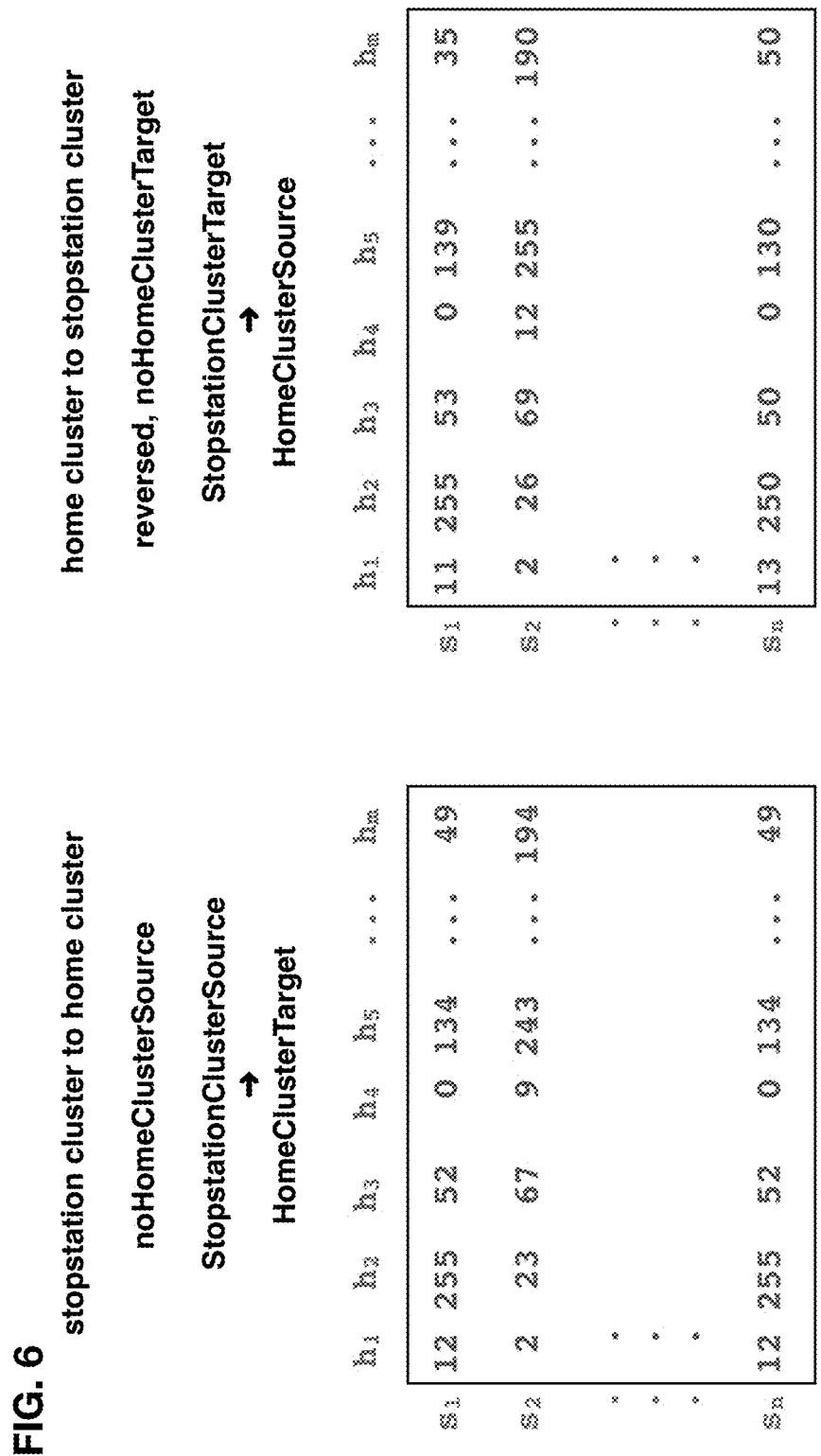
FIG. 6: depicts an example table/vector storage of precomputed shortest travel durations according to an embodiment of the invention, legend: "An example table/vector storage of precomputed shortest travel durations."

In one embodiment, our method stores travel durations in a vector form. The method sequences stopstation clusters as $s_1, \ldots, s_n$, and sequences home clusters as $h_1, \ldots, h_m$ in some orders, for example random orders. In one embodiment, these sequences become fixed. For each $s_i$, the method stores a vector of shortest travel durations from $s_i$ to the home clusters using the home cluster sequence $$v_i = (t_{i,1}, t_{i,2}, \ldots, t_{i,m}),$$

so that the value of the vector $v_i$ at a coordinate j, $v_i[j]$, is $t_{i,j}$ equal to the shortest travel duration from the stopstation cluster $s_i$ to the home cluster $h_j$. See FIG. 6 for an illustration.

The home cluster sequence simplifies the calculation of a shortest travel duration to every home cluster. For example, if a commuter needs to travel from a stopstation cluster $s_{i_1}$, and in addition from a stopstation cluster $s_{i_2}$, we simply add vectors $v_{i_1}$ and $v_{i_2}$ coordinate-wise, and the resulting sum contains the total travel duration from both stopstation clusters to each home cluster $h_1, \ldots, h_m$.

In one embodiment, the method stores durations of reversed travel, from homes to stopstations, using the same home cluster sequence. That is, the method stores a vector $$v'_i = (t'_{i,1}, t'_{i,2}, \ldots, t'_{i,m}),$$

so that $v'_i[j] = t'_{i,j}$ is the shortest travel duration from the home cluster $h_j$ to the stopstation cluster $s_i$ (note the transposition; the vector $v'_i$ is for one stopstation cluster, even though travel is in the opposite direction).

In general, the two vectors for the same stopstation cluster $s_i$ are not equal, $v_i \neq v'_i$, because the minimum travel duration to a home may be different than from a home (travel is not symmetric in general). However, in one embodiment the method computes and stores just one of the two vectors, and uses it instead of the other, which can save time and space. In other embodiments, the method stores a coordinate-wise weighted average of the two vectors, which may decrease a worst-case error. The weights may be set to 0.5, or may favor travel from, or may favor travel to a specific home cluster, for example based on request frequency.

In one embodiment, the method stores travel durations rounded to the closest minute, using one byte of computer memory, represented as an unsigned integer from 0 to 254, with 255 denoting an unknown or too large travel duration. This storage enables efficient vector addition using modern computer hardware support for Vector Operations and Saturation Arithmetic (for example the AVX-512 instruction set, or GPU intrinsics), while keeping the error at a practically acceptable level of at most half a minute, and covering common travel durations up to over 4 hours. Any other rounding can be used, for example a duration in seconds can be divided by 120, and rounded to an integer, which will represent durations at a 2-minute granularity.

In one embodiment, the method stores a vector not for clusters. For example, some of the $s_1, \ldots, s_n$ represent stopstations (not stopstation clusters), or some of the $h_1, \ldots, h_m$ represent homes (not home clusters).

In one embodiment, the method uses other form of a vector to store travel durations. For example, a hash map, or a (coordinate, value) list. These sparse forms may be advantageous when there are many unknown or too large travel durations.

In one embodiment, the method stores travel paths using vectors that follow the home cluster sequence $h_1, \ldots, h_m$, or using other form of a vector, for example a hash map or a (coordinate, value) list. These travel paths may be used during request processing to filter travel paths whose features match a condition specified in the request.

4.5 Travel Duration of One Commute Path

Figure 7:
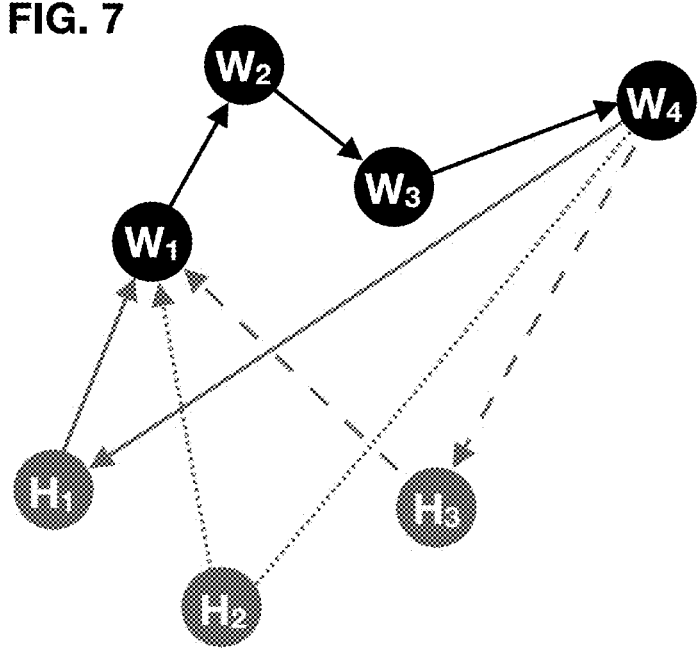
FIG. 7: depicts an example of a commute path decomposition according to an embodiment of the invention, legend: "An example commute path $H \rightarrow W_1 \rightarrow W_2 \rightarrow W_3 \rightarrow W_4 \rightarrow H$ decomposed into a home-dependent part (green) and a home-independent part (black), illustrated on three homes $H_1$, $H_2$, and $H_3$."

We describe how our method efficiently computes the shortest travel duration of any commute path. Consider any commute path from a home cluster H, through k≥1 works, back to the home cluster: $H \to W_1 \to W_2 \to \ldots \to W_k \to H$. We want to find the shortest travel duration of this commute path for every H. This may be expensive, because the number of home clusters may be rather large, for example 500,000 given a clustering radius of a few meters. However, our method introduces a technique that dramatically accelerates the search: the method decomposes any commute path into a home-independent part, and a home-dependent part, as illustrated in FIG. 7.

4.5.1 Middle Part: Travel $W_1 \to W_2 \to \ldots \to W_k$

The method finds the shortest travel duration for travel $W_1 \to W_2 \to \ldots \to W_k$ that excludes the home cluster. For each segment $W_i \to W_{i+1}$, the method queries a routing engine (for example prior art) that computes the shortest travel duration from $W_i$ to $W_{i+1}$ using the transportation system (for example, involving walks, subway and bus rides, transfers, including a direct walk from $W_i$ to $W_{i+1}$). Then the method adds up the shortest travel durations across the different i. The resulting sum is denoted by $$PathNonHomeDuration(W_1 \to W_2 \to \ldots \to W_k) = \sum_{1 \le i \le k-1} RoutingEngineShortestDuration(W_i \to W_{i+1}).$$

We note that only k−1 queries to the routing engine are needed. This number is independent of the number of homes.

In one embodiment, the method uses a departure time, an arrival deadline, or other parts of a request, when querying the routing engine.

Next, the method computes the shortest travel duration for the open-jaw part of the commute path: the two segments $H \rightarrow W_1$ and $W_k \rightarrow H$ that involve the home cluster. This computation needs to be especially quick, because its result is needed for every home cluster.

4.5.2 Start Part: Travel $H \rightarrow W_1$

Figure 8:
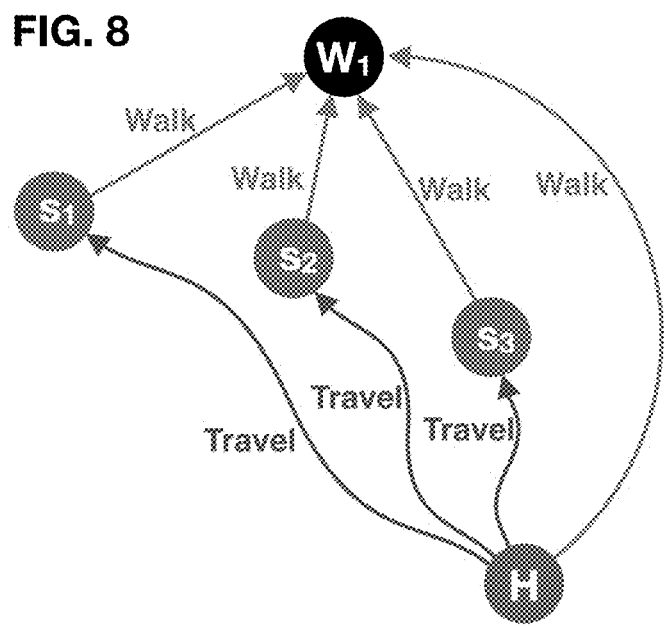
FIG. 8: depicts an example of computing the shortest travel duration at the start of a commute path according to an embodiment of the invention, legend: "An example of computing the shortest travel duration at the start of a commute path."

The method considers two ways of getting from H to $W_1$. See FIG. 8 for an illustration. The first way is a direct walk. When H and $W_1$ are nearby, a true shortest travel will often be a direct walk. The method thus queries a walk engine (for example prior art) to compute the shortest walk duration walk($H \rightarrow W_1$). The second way uses the transportation system. The method finds the stopstation clusters that are within a threshold distance, for example 2000 meters, from $W_1$, denoted by a set A. The set A is a subset of $\{s_1, \ldots, s_n\}$ of all stopstation clusters (in FIG. 8 the $A=\{s_1, s_2, s_3\}$). The method queries a walk engine to retrieve a shortest walk duration walk($s_i \rightarrow W_1$), for each $s_i$ in A. When H and $W_1$ are not nearby, a true shortest travel will often pass through a stopstation in the set A, and then continue along a corresponding walk. Due to the two-way approach we apply, the resulting travel duration often is a shortest travel duration.

The two-way approach can be applied to each home cluster. We recall that a vector $v'_i$ contains shortest travel durations to stopstation cluster $s_i$ from consecutive home clusters. Therefore, the method computes a shortest travel duration from a home cluster $h_j$ by retrieving vectors $v'_i$ from the database, and using the following formula $$a_j = \min\left\{\text{walk}(H_j \rightarrow W_1), \min_{s_i \in A}\{v'_i[j] + \text{walk}(s_i \rightarrow W_1)\}\right\}. \quad \text{(Equation 1)}$$

In one embodiment, the method computes walk($H_j \rightarrow W_1$) only when the distance from home cluster $H_j$ to $W_1$ is below a threshold, for example 2000 meters, or when a travel duration from home cluster $H_j$ to $W_1$ is below a threshold. Let us denote the set of such home clusters by J.

In one embodiment, because of the vector representation of the v', the method jointly computes the travel duration from every home cluster, using vector operations on the v' as follows:

$$\text{for } j = 1 \text{ to } m$$
$$a_j = \infty$$
$$\text{for all } s_i \in A$$
$$w = \text{walk}(s_i \rightarrow W_1)$$
$$\begin{pmatrix} a_1 \\ a_2 \\ \vdots \\ a_m \end{pmatrix} = \begin{pmatrix} \min\{a_1, v'_i[1] + w\} \\ \min\{a_2, v'_i[2] + w\} \\ \vdots \\ \min\{a_m, v'_i[m] + w\} \end{pmatrix}$$
$$\text{for all } j \in J$$
$$w = \text{walk}(H_j \rightarrow W_1)$$
$$a_j = \min\{a_j, w\}.$$

In one embodiment, the method uses a mathematical formula $$\min_{s_i \in A}\{\text{walk}(s_i \rightarrow W_1) + v'_i\},$$

where the "+" operation adds a number to a value at each coordinate of a vector, and the "min" operation computes a minimum value at each coordinate across several vectors.

The vector $(a_1, \ldots, a_m)$ of travel durations is denoted by $$\text{PathFromHomeDurations}(\rightarrow W_1) = (a_1, \ldots, a_m).$$

An example pseudocode for computing PathFromHomeDurations is illustrated in FIG. 10.

In one embodiment, a unit 8 number format is used to store $a_j$, $v'_i[j]$, or w. In one embodiment, the unit of a number stored is minutes. In one embodiment, a sum $v'_i[j]+w$, for some j, is performed using Saturation Arithmetic in the range from 0 to a threshold, for example 255. In one embodiment, a summand $v'_i[j]$ is first converted into a wider number format, for example into an fp16 format or a unit 16 format, and only then added to w, to avoid an arithmetic overflow during an addition. In one embodiment, some calculations included in the mathematical formula are performed using at least one instruction for Vector Operations (including tensor operations), for example an AVX-512 instruction or a GPU intrinsic supported by hardware. In one embodiment, some calculations included in the mathematical formula are partitioned, and the partitions are executed in parallel.

In one embodiment, the method uses a nearest-neighbor data structure, for example a KD-tree, on stopstation cluster locations to quickly compute the set A during request processing.

In one embodiment, the method limits the set A to at most a certain number of stopstation clusters that are nearest $W_1$, for example at most 100.

In one embodiment, the method limits the set A to stopstation clusters within a walk of at most a certain length to $W_1$, for example 2000 meters.

In one embodiment, the method precomputes shortest durations of walks between points within a threshold distance from each home cluster location and the home cluster location, or precomputes shortest durations of walks between points within a threshold distance from stopstation cluster locations and the stopstation cluster location. Then, during request processing, the method does not query any walk engine, but instead uses the precomputed walk durations.

In one embodiment, a shortest duration of a walk is estimated using a geodesic line that ignores any obstacles. This may speed up the computation of a walk($s_i \rightarrow W_1$) at the expense of accuracy.

In one embodiment, travel paths are used in Equation 1. For example, if a user request specifies a condition that limits the number of vehicle transfers, we filter $s_i$ and j in the equation: we look up the number of transfers stored in a travel path, and when that number exceeds the limit, we ignore the specific $s_i$ and j in the equation.

In one embodiment, grouping travel durations by the stopstation $s_i$, just like we did in $v'_i$, improves data access performance. Indeed, although the set A depends on a user request that is not known in advance, for each $s_i$ in the set A, predictably a large number of travel durations need to be accessed.

In one embodiment, the vectors $v'_i$, for a collection of i, are distributed randomly across different processing units. This may decrease the latency of computing the vector $(a_1, \ldots, a_m)$, because the stopstations included in the set A will often be evenly divided across the processing units.

In one embodiment, the vectors $v'_i$, for a collection of i, are grouped geographically inside a processing unit. This may increase the throughput of computing the vector $(a_1, \ldots, a_m)$, because of a reduced need for data transfer, due to the fact that the set A often consists of stopstations located near one another.

4.5.3 End Part: Travel $W_k \to H$

Figure 9:
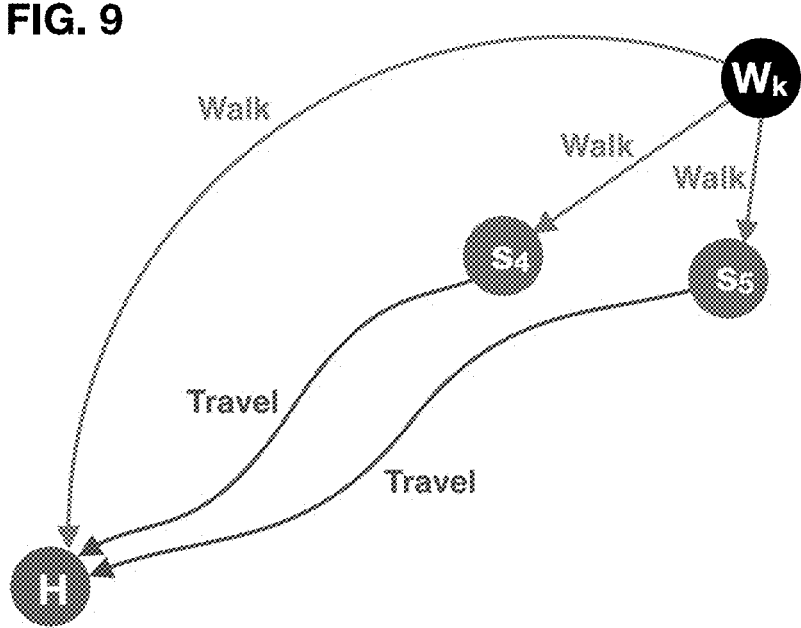
FIG. 9: depicts an example of computing the shortest travel duration at the end of a commute path according to an embodiment of the invention, legend: "An example of computing the shortest travel duration at the end of a commute path."

The computation is analogous, but uses vectors v, not v'. See FIG. 9 for an illustration. The method computes a set B of stopstation clusters within a threshold distance from $W_k$ (in FIG. 9 the $B=\{s_4, s_5\}$). Then the method computes a shortest travel duration to the home cluster $h_j$ as $$b_j = \min\left\{\text{walk}(W_k \to H_j), \min_{s_i \in B}\{\text{walk}(W_k \to s_i) + v_i[j]\}\right\}. \quad \text{(Equation 2)}$$

Similar as before, in one embodiment, because of the vector representation of the v, the method jointly computes a travel duration to every home cluster using vector operations on the v according to Equation 2. In one embodiment, the method uses a mathematical formula $$\min_{s_i \in B}\{\text{walk}(W_k \to s_i) + v_i\}.$$

The vector $(b_1, \ldots, b_m)$ of travel durations is denoted by

PathToHomeDurations$(W_k \to) = (b_1, \ldots, b_m)$.

The method uses embodiments similar as in Section 4.5.2. For example, in one embodiment, the method uses a vector operation that together computes a part of the vector $(a_1, \ldots, a_m)$ and a part of the vector $(b_1, \ldots, b_m)$.

4.5.4 Combining Start, Middle, and End Parts

Finally, the method computes the shortest travel duration of the commute path for every home cluster. The method simply adds the two vectors and shifts values at the coordinates. We denote the resulting vector by PathDurations$(\to W_1 \to W_2 \to \ldots \to W_k \to)$=Path-
FromHomeDurations$(\to W_1)$+PathToHomeDurations$(W_k \to)$+PathNonHomeDuration$(W_1 \to W_2 \to \ldots \to W_k)$, (Equation 3)

where the first "+" is a coordinate-wise addition of vectors, and the second "+" is an addition of a number to a value at every coordinate of a vector.

In one embodiment, the method computes travel durations given specific departure times from, or arrival deadlines to, any geographical location along any commute path.

In one embodiment, the method precomputes PathDurations for specific commute paths. For example, the method computes and stores PathFromHomeDurations$(\to W)$ and PathToHomeDurations$(W \to)$, for every W that is a school. During request processing, the method retrieves precomputed vectors from the database, instead of computing them with Equation 1, Equation 2, and Equation 3.

In one embodiment, the value of PathDurations may be changed. Consider a school W that has a zoning requirement that specifies that only certain homes may send children to the school. This can be simply achieved by setting the values at coordinates of a vector PathFromHomeDurations $(\to W)$ to infinity for these home clusters that are outside of the zone of the school, and similarly setting values at coordinates of a vector PathToHomeDurations $(W \to)$. A similar change can be made when W is a restaurant with a limited delivery area, or a government office with a limited jurisdiction. Thus changed values may be stored, and retrieved during request processing.

In one embodiment, our method applies an arbitrary "manipulation" function to the values at coordinates of vectors $v_i$, $v'_i$, or PathDurations. For example, this can help implement a policy of a government that reduces the transportation charge for commuting from or to certain parts of a metropolitan area in a special economic zone affected by a disaster. An application can be performed before request processing (for example a global policy), or during request processing (for example a user-personalized policy).

In one embodiment, the method computes PathDurations for a subset of home clusters. For example, the subset is determined from a condition on home features specified by a user request. In one embodiment, we select the sequence $h_1, \ldots, h_m$ of home clusters so that these subsets often reside in a short segment of the sequence, which reduces data transfer.

4.6 Search for One Home

Our method teaches how to efficiently search for a home using commutes. We present a few example search requests first, before we introduce a general search request for one home.

4.6.1 Weighted Sum Request

Consider a family with one parent going to work located at geo1 five times per week, and the other parent going to work at geo2 three times per week. This family wants to find a home with a short weekly travel duration. We can find the weekly travel duration for the family for every home cluster as a weighted sum of two vectors, as follows:

5·PathDurations$(\to \text{geo1} \to)$

+3·PathDurations$(\to \text{geo2} \to)$.

4.6.2 Minimum Request

Consider a single mother who works from home, and is sending a child to school. The mother wants to find a home that will be near any school from among schools E. We can find the daily travel duration for the child for every home cluster as a coordinate-wise minimum of vectors, as follows:

$$\min_{e \in E} \text{PathDuration}(\to e \to).$$

4.6.3 General Search for One Home

In one embodiment, our method defines a request as any sequence of commute paths $path_1, \ldots, path_q$, for any q, and a function Deriver: $\mathbb{R}^q \to \mathbb{R}$ that maps any vector of q numbers into a number. The method computes the travel duration vectors (from scratch, by retrieving precomputed vectors, or both)

$$PathDurations(path_1)=(d_{1,1}, \ldots, d_{1,m}),$$

$$\ldots,$$

$$PathDurations(path_q)=(d_{q,1}, \ldots, d_{q,m}),$$

and applies the function Deriver coordinate-wise to the vectors, to produce a vector $$RequestDurations(path_1, \ldots, path_q, Deriver)=$$

$$(Deriver(d_{1,1}, \ldots, d_{q,1}),$$

$$Deriver(d_{1,2}, \ldots, d_{q,2}),$$

$$\ldots,$$

$$Deriver(d_{1,m}, \ldots, d_{q,m}))$$

with a "derived" travel duration for each home cluster.

In one embodiment, the function Deriver is a weighted sum of numbers $$Deriver(x_1, \ldots, x_q) = w_1 \cdot x_1 + \ldots + w_q \cdot x_q,$$

for weights $w_1, \ldots, w_q$. Weights can be positive or negative. If a travel duration is interpreted as a monetary cost of travel, then a negative weight can be interpreted as a monetary gain, for example if the commuter is expected to benefit from performing the specific commute (e.g., a delivery of a parcel). Weights can represent relative importance of commute paths, for example a commute path of a Chief Executive Officer may have a higher weight than a commute path of a first-line manager.

In one embodiment, the function Deriver is a minimum of numbers $$Deriver(x_1, \ldots, x_q) = \min_{1 \le i \le q} x_i.$$

In one embodiment, the function Deriver is a weighted sum and a minimum $$Deriver(x_1, \ldots, x_r, x_{r+1}, \ldots, x_q) = w_1 \cdot x_1 + \ldots + w_r \cdot x_r + \min_{r+1 \le i \le q} w_i \cdot x_i.$$

In one embodiment, the function Deriver is a conditional, for example $$Deriver(x_1, x_2) = [\\ \text{if } x_1 < 30 \text{ then}\\ \text{return } x_1 + x_2\\ \text{else}\\ \text{return } \infty],$$

or any algorithm.

4.7 Compare Two or More Homes

Our method teaches how to efficiently compare multiple homes using commutes. We illustrate the method on a few examples, before we introduce a general comparison request.

4.7.1 Current Home

Consider a family that currently lives in a home. The family members have specific commute paths to work places, schools, and other places. The family considers a move to other home, and wants to compare the total travel duration for their current home with the total travel duration for other prospective homes. Our method makes such a comparison rather simple.

In one embodiment, the method computes the travel duration for every home cluster, including the home cluster $h_j$ of the current home S of the family $$RequestDurations=(q_1, \ldots, q_m).$$

The method then responds with a "difference" vector: the method subtracts the value at the j-th coordinate from the value at each coordinate $$(q_1-q_j, \ldots, q_{j-1}-q_j, 0, q_{j+1}-q_j, \ldots, q_m-q_j).$$

A negative value at a coordinate of the "difference" vector indicates that the home corresponding to the coordinate has a shorter travel duration compared to the current home S.

In one embodiment, the method uses some commute paths for the current home, but other commute paths for other homes. Thus the method can help a family evaluate a what-if scenario: "Suppose we change workplaces, and move to some other home. How will the new commute duration compare to our current commute duration?"

642 4.7.2 General Comparison for Two or More Homes

Consider a family where the mother and the father must continue commuting to the same work places (no job change), but the children can change schools. Consider other example of two families: parents and their maternal grandparents. They want to find two homes within around 30 minutes from each other, so that one home is near any hospital, and the other home is near specific schools and work places. Our method makes comparisons of such homes with other homes rather simple.

In one embodiment, the method computes travel durations PathDurations for home clusters for a range of commute paths $$PathDurations(path_1)=(d_{1,1}, \ldots, d_{1,m}),$$

$$\ldots,$$

$$PathDurations(path_q)=(d_{q,1}, \ldots, d_{q,m}).$$

Then the method applies a "generalized" function Deriver that does not operate coordinate-wise as in Section 4.6.3, but instead operates jointly on all q·m travel durations, and produces a vector of one or more numbers. In other words, the generalized function is $$Deriver: \mathbb{R}^{q \cdot m} \to \mathbb{R}^y,$$

for some y.

4.8 Search-or-Compare

In one embodiment, the function Deriver is any algorithm, for example a randomized algorithm, that takes any input (for example: the commute paths, shortest travel paths, shortest travel durations, the homes, or any condition specified by a user request), and produces any output (for example: a "top list" containing homes that satisfy the user condition, and that have shortest travels that also satisfy the user condition, sorted by the shortest travel durations).

4.9 Variants

Many modifications and variations will be apparent to those of ordinary skill in the art without departing from the scope and spirit of the embodiments. We present of few variants for illustration.

4.9.1 Extending Travels

In one embodiment, the method first computes incomplete shortest travels, and then extends them to selected home clusters. This trades off additional processing and storage for a decrease in storage and processing due to fewer home clusters in vectors $v_i$ and $v'_i$.

The method determines home connectors which are some elements of the transportation system. In one embodiment, the home connectors are clusters of homes or clusters of stopstations, which may differ from the clusters discussed in Section 4.4.1. Then the method precomputes and stores in a database shortest travels between the stopstation clusters and the home connectors, using embodiments similar to these of Section 4.4.

When a request is received, the method computes shortest travels between a work W contained in the request, and the selected home clusters. For this purpose, the method determines stopstation clusters nearby the work W, and retrieves precomputed shortest travels between the nearby stopstation clusters and the home connectors, to compute shortest travels between the work W and the home connectors, similar to Section 4.5. In one embodiment, this computation uses vector operations similar to these of Sections 4.5.2 and 4.5.3. Then these shortest travels are extended beyond the home connectors, to form shortest travels between the work W and the selected home clusters. This can be achieved by simply finding, for each home cluster, a minimum extended travel (which may be not just a walk) that passes through any home connector near the home cluster, for example within 2000 meters, and sometimes finding a direct shortest travel between the work W and the home cluster (similar to Sections 4.5.2 and 4.5.3). In one embodiment, in an overlap area the method uses both the home connectors and the vectors $v_i$ and $v'_i$.

The performance of extending travels is proportional to the total number of home connectors, and also proportional to the number of home connectors near any selected home cluster. In one embodiment, the extending is used in sparse parts of a metropolitan area, where the two quantities are likely to be low. In one embodiment, the method uses a performance cost function to: (1) determine home connectors, (2) select home clusters, and (3) determine a subset of nearby home connectors for each of the selected home clusters.

4.9.2 Commute by Car

In one embodiment, we compute travel durations of commute paths by car, rather than by public transportation. This can be achieved by simple modifications to earlier sections.

When preprocessing a transportation system for homes, Section 4.4, instead of taking a GT to be a graph of a public transportation system, we take a GT to be a graph of a car drive system. This car drive graph can be obtained, for example, from prior art. That graph may have vertexes representing geographical locations on roads, and edges representing driving a car or turning a car; edges may contain data about drive durations at various times of the day, for example during rush hours.

We extend GT. For each home cluster s, we add vertexes

HOME_CLUSTER_SOURCE_$s$ and

HOME_CLUSTER_TARGET_$s$.

We connect each home cluster with some roads that are within a threshold distance, for example meters, by adding a vertex CONNECTOR_$r$, for at least one r. In one embodiment, the vertex denotes a shortest-distance projection of a home cluster location onto a road that is within a threshold distance; the road may be inside a car parking assigned to the home cluster. The vertex is connected to the two home cluster vertexes by edges labeled Zero with weight 0. The vertex is also connected to vertexes representing endpoints of a segment of the road. Instead of adding clusters of stopstations, which we should not because now GT does not model any subway station nor bus stop, we add vertexes REPRESENTATIVE_SOURCE_$s'$ and REPRESENTATIVE_TARGET_$t'$ for a collection of s' and t'; these vertexes represent locations that frequently occur in shortest travels; the locations can be obtained, for example, using prior art. These vertexes may represent clusters. These vertexes get appropriately connected with other vertexes using edges.

We use the extended GT to compute shortest durations of graph paths from each

REPRESENTATIVE_SOURCE_$s'$ to every

HOME_CLUSTER_TARGET_$s$, and from each

HOME_CLUSTER_SOURCE_$s$ to every

REPRESENTATIVE_TARGET_$t'$, possibly using embodiments similar to these described in Section 4.4.1. These travel durations will be stored in a vector form $v_i$ and $v'_i$ as described in Section 4.4.2.

When computing a travel duration of a commute path, we use car rides, instead of using walks as in Section 4.5.

For a start part of a travel, we make the following modifications to Section 4.5.2. Instead of walk($H_j \rightarrow W_1$), we use a duration of a car ride from a home cluster $H_j$ to $W_1$, for example obtained from prior art; in one embodiment we instead set this duration to infinity when the distance between $H_j$ and $W_1$ is above a threshold. The set A is a set of vertexes REPRESENTATIVE_TARGET_$t'$ that are within a threshold distance from $W_1$. For each vertex $s_i \in A$, we compute a car drive duration from $s_i$ to $W_1$, for example using prior art. Then we apply these modifications to Equation 1.

For an end part of a travel, we make similar modifications, but now to Section 4.5.3. Instead of walk($W_k \to H_j$), we use a duration of a car ride from $W_k$ to a home cluster $H_j$, for example obtained from prior art; in one embodiment we instead set this duration to infinity when the distance between $W_k$ and $H_j$ is above a threshold. The set B is a set of vertexes REPRESENTATIVE_SOURCE_$s'$ that are within a threshold distance from $W_k$. For each vertex $s_i \in B$, we compute a car drive duration from $W_k$ to $s_i$, for example using prior art. Then we apply these modifications to Equation 2.

We use other embodiments stated in Section 4.5. For example, we may estimate a travel duration of a car ride using a geodesic.

The search framework of Section 4.6 can be simply extended to allow to restrict what kind of vehicles should be used for each commute path. As a result, for example, we can determine travel durations of commute paths for every home for a family with one parent going to work located at geo1 by car five times per week, and the other parent going to work at geo2 by public transportation three times per week.

The comparison framework of Section 4.7 can similarly be extended. As a result, for example, we can search for a new home from which a person will commute by car, and compare with the current travel duration by public transportation. A result of our method may be used as an incentive to purchase a car due to a move.

4.9.3 Commute by Other Means

In one embodiment, the method uses commute paths by other means, for example: walk only; bicycle only; express buses and walks only; subway and walks only; express buses, subway and walks only; shared vans and walks only; boats; airplanes; and so on. We simply use modifications similar to these described in Section 4.9.2. In one embodiment, the method identifies other home and other means of travel, and recommends these to the user, explaining gains compared with the current home and the current means of travel.

Shortest graph paths in a given graph can be computed without knowing geographical locations of the various vertexes of the graph. Hence, in one embodiment, the method uses a transportation system whose various elements lack geographical location.

The transportation system need not physically move objects. The method merely needs to be able to determine route or route lengths between the elements of the transportation system. Thus a computer network, that moves data, is an example of a transportation system, comprising these transportation elements: wires/lines (analogous to roads), and hubs/switches (analogous to stops/turns). Many other examples of a transportation system will be apparent to anyone of ordinary skill in the art.

4.9.4 Conditions on Travel Paths

We can simply realize various filtering conditions on travel paths. For example, we can build a graph G that has no transfer between any subway lines but has walks between home clusters and station clusters. Along with modifications similar to these described in Section 4.9.2, the method will then search-or-compare homes when a commuter may sit all the way during a ride between home and work (both the home and the work will need to be within a walking distance from a subway stop of one subway line). Similarly, we can build a G and modify shortest graph path algorithms so as to restrict graph paths to at most one transfer, or a subway-bus transfer, or a bus-subway transfer, or a transfer that occurs within a time window, or a type of travel path commonly used by commuters. Other variations for filtering travel paths fall within the scope of our method, as will be apparent to anyone of ordinary skill in the art.

4.9.5 Conditions on Homes

In one embodiment, the method receives a filtering condition on various features of homes, and searches or compares homes whose features match the condition. The features may be: a type (e.g., a detached home or a high-rise apartment), a transaction type (e.g., sale or rent), a price, a real estate agent commission fee, taxes, a maximum bank loan amount, a number of bedrooms or bathrooms, an area/size of a home, geographical directions of windows, a floor number of a home, the number of floors in the building, or a typical monthly management fee. Simply the method maintains a feature list for each home, and, given a condition, determines the homes whose features match the condition. The travel durations for these matching homes can be obtained from travel durations for home clusters. Other variations for filtering homes fall within the scope of our method, as will be apparent to anyone of ordinary skill in the art.

4.9.6 Meta Search-or-Compare

In one embodiment, the method searches or compares homes using an ensemble of prior search-or-compare requests and responses. This can be viewed as a meta method (a method that uses itself). It is useful, for example, for estimating the value of a proposed new real estate development.

We describe an embodiment of the meta method. We receive some number u of commute paths $path_1, \ldots, path_u$. In one embodiment, the commute paths come from a usage log of a computer service for searching or comparing homes, each commute path may be provided by a different user of the service. For each commute path $path_k$, we compute the travel durations for all home clusters PathDurations($path_k$) according to Section 4.5. Then, we apply an aggregator that processes the travel durations. In one embodiment, for each commute path $path_k$, we receive a vector of weights $w_k$. In one embodiment, each weight is a probability of a user clicking on a home in the corresponding home cluster, which may be affected by a condition for a real estate property or for a travel path specified in the user request. Then we compute aggregates coordinate-wise, as in the following formula $$\frac{1}{u}\sum_{k=1}^{u} w_k \cdot PathDurations(path_k).$$

The j-th aggregate is an average weighted travel duration for home cluster $H_j$. In one embodiment, the j-th aggregate denotes a normalized contribution of the home cluster to the total travel duration of the entire metropolitan area; in a sense, it is a centrality of the home cluster within the metropolitan area. Because our method rapidly computes PathDurations($path_k$), we can compute the aggregates quickly. This enables a rapid computation of a desirability of each real estate property with respect to commuting.

Many other embodiments of the meta method will be apparent to those of ordinary skill in the art. In other embodiment, the commute paths are generated from geographical locations of homes and works. In other embodiment, the weights are set to non-zero for some number of home clusters with the lowest travel durations, others are set to zero. In other embodiment, a data scientist evaluates what-if scenarios; because of advantages of our method, these scenarios can be evaluated rapidly. In other embodiment, the aggregator is an arbitrary algorithm, for example one that computes a variance, quantiles, a cumulative distribution function, or a probability of exceeding a threshold.

4.9.7 Commute Path Involving Two or More Homes

In one embodiment, a commute path involves any two or more homes. This is useful, for example, when searching or comparing homes jointly for two or more families.

In one embodiment, $H_1$ and $H_2$ are two home clusters. We can compute a travel duration of any commute path $H_1 \rightarrow path \rightarrow H_2$ that starts at $H_1$, but ends at $H_2$ that may be different from $H_1$. We simply use a j corresponding to $H_1$ in Equation 1, but use a j corresponding to $H_2$ in Equation 2.

In one embodiment, we precompute both vectors $(a_1, \ldots, a_m)$ and $(b_1, \ldots, b_m)$, and then we find a travel duration for arbitrary two home clusters $H_i$ and $H_j$ by simply adding a value at a coordinate of $(a_1, \ldots, a_m)$ corresponding to $H_i$ to a value at a coordinate of $(b_1, \ldots, b_m)$ corresponding to $H_j$, plus the travel duration of the middle part of the path (which is independent of $H_i$ and $H_j$). We remark that a travel duration for any pair of home clusters, from among the $m^2$ pairs, can be found in constant $O(1)$ time using only linear $O(m)$ space. This is because of an additive structure of the travel duration and the fact that the path acts as a separator between any two home clusters.

In one embodiment, the set of home clusters allowed for $H_1$ may be different from the set of home clusters allowed for $H_2$. For example, a user condition can restrict $H_1$ to be in the east part of a city, while $H_2$ to be in the west part of the city. In this case we may use a vector $(b_1, \ldots, b_{m'})$ of length at m' that is different from m.

More generally, the method computes a travel duration for any sequence of k≥2 home clusters $H_1 \rightarrow path_1 \rightarrow H_2 \rightarrow path_2 \rightarrow \ldots \rightarrow path_{k-1} \rightarrow H_k$. Using precomputing, this can be done in $O(k)$ time and $O(m \cdot k)$ space.

In one embodiment, a commute path includes a direct travel between home clusters, $H_x \rightarrow H_y$, as in this example commute path: $H_1 \rightarrow path_1 \rightarrow H_x \rightarrow H_y \rightarrow path_2 \rightarrow H_2$. In this example, our method partitions the computation into three parts: (1) compute a travel duration of $H_1 \rightarrow path_1 \rightarrow H_x$, (2) compute a travel duration of $H_x \rightarrow H_y$, and (3) compute a travel duration of $H_y \rightarrow path_2 \rightarrow H_2$. The parts (1) and (3) can be performed using the method described earlier in the current Section 4.9.7. The part (2) can be performed similarly, conceptually treating either $H_x$ or $H_y$ as a work. For example, using the vectors at the coordinate corresponding to $H_x$, we obtain travel durations from the home cluster $H_x$ to every stopstation cluster; these can be retrieved as a column of the precomputed vectors $v'_i$, $1 \leq i \leq n$. Then we extend from each stopstation cluster within a threshold distance from $H_y$ to form a complete travel to $H_y$, similar to Section 4.5.2, see for example FIG. 8 and Equation 1. Because of precomputing due to our method, the (3) can be performed in time proportional to the number of the stopstation clusters within the threshold distance. In other embodiment, because the home clusters are known in advance, we precompute a travel duration between every pair of home clusters, and then simply retrieve a travel duration in constant $O(1)$ time. Naturally, a similar partitioning applies to any commute path that contains one or more direct travel between home clusters.

4.9.8 Space Exploration

Our method introduces high-performance space exploration algorithms. Consider a case when a commuter travels along a specific commute path $H_1 \rightarrow path \rightarrow H_2$ which has a specific cost; the cost function depends on the two homes $H_1$ and $H_2$. The commuter seeks homes $H_1$ and $H_2$ that minimize the cost. This is useful, for example, when a family is willing to change work locations ($H_1$ and $H_2$) of the two parents at the same time, while minimizing the total travel duration from the current home location (inside path) of the family, aka the two-body problem.

One embodiment of space exploration is a gradient descent algorithm. The cost function can be any differentiable function; for example, given a fixed path, the function takes two homes $H_1$ and $H_2$ as an input, and returns as an output a distance between the two homes $H_1$ and $H_2$ multiplied by a travel duration of a commute path $H_1 \rightarrow path \rightarrow H_2$ (this function can be appropriately extended outside of the discrete domain of home pairs, for example via geographical location of homes and extrapolation). At a given step of the gradient descent algorithm, the algorithm computes a gradient of the cost function given a pair of homes, and then picks a pair of homes along the direction of the gradient for the next step of the algorithm. The gradient can be computed using values of the cost function, for example using the two-point formula that needs two values. In one embodiment, the output of the gradient descent algorithm is a pair of homes where the gradient has a small enough norm.

In one embodiment, we precompute the vectors $(a_1, \ldots, a_m)$ and $(b_1, \ldots, b_m)$ consuming linear $O(m)$ space, and at each step our method computes the gradient in constant $O(1)$ time. Thus the gradient descent algorithm can often make rapid progress.

In one embodiment, we do not precompute $(a_1, \ldots, a_m)$ and $(b_1, \ldots, b_m)$, but instead produce the needed values per Equation 1 and Equation 2 on-demand. Such approach may be used when the number of homes is so large that precomputing $(a_1, \ldots, a_m)$ or $(b_1, \ldots, b_m)$ is infeasible.

In one embodiment, a space exploration algorithm may have constraints on homes. For example, if we require a round-trip commute to one home, a constraint will be $H_1=H_2$. We may restrict a geographical region allowed for $H_1$, or allowed for $H_2$.

In one embodiment, a space exploration algorithm uses a commute path involving only one home: $H_1 \rightarrow path$ or $path \rightarrow H_1$. In other embodiment, a space exploration algorithm uses a commute path involving two or more homes, as in Section 4.9.7.

In one embodiment, a cost function depends on homes and works. For example, such cost function can be used when a person seeks to minimize a blend of expended time and money. In one embodiment, the cost function is: the travel duration between H and W, plus the monetary cost of renting H, minus the salary paid by W, possibly with weights that represent relative importance of the constituents. In one embodiment, because of advantages of our method, a gradient descent can efficiently be used to search for homes and works under such cost function.

4.10 General Case

In one embodiment, the words "home" and "work" have an arbitrary semantic meaning. For example, consider a case where a person is looking for work that is located near the current home of the person. The person does not want to move to a different house, but merely wants to find a job closer to the current home. In this case, our method can be simply applied. Given a range of sites where people work throughout a metropolitan area (for example various offices, factories, etc.), the method computes travel durations between every work site cluster, and each stopstation cluster. Thus the method can be viewed as a "work search-or-compare using commute" method. In one embodiment, the method searches or compares work sites based on a user-specified job type, or a salary range, and based on a travel duration from the current home of the user. As other example, consider a corporation that wants to move its headquarters to a new location. Our method can be used to compute the total "corporate travel duration" for every new location of the headquarters throughout the metropolitan area. Thus, the corporation may determine how each new location will affect commutes of the employees. A new location may be selected, for example, so that: (1) the worst-case commute duration is limited, and (2) the average commute duration is low; thus satisfying individual and social objectives.

Our description so far mainly talked about a travel duration as the search or compare objective. However, the method can use any other objective, for example: a monetary cost of travel; a metric distance; specific features or attributes of travel paths, for example: the number of transfers, or a walking distance; or features of homes, for example: a price, a size, or a type. In one embodiment, this can be simply achieved by building graphs and setting edge weights appropriately. Various objectives may be combined into a multi-objective optimization search based on a multi-dimensional cost, for example to search for a home that minimizes a travel duration that is penalized by the monetary cost of travel.

In general, the method uses arbitrary sites $S_1, \ldots, S_m$ (a site was called a home in earlier sections) and arbitrary places $P_1, \ldots, P_k$ (a place was called a work in earlier sections), and the method searches or compares the sites $S_1, \ldots, S_m$ using routes or route lengths (in earlier sections: a route was called a description of travel, and a route length was called a length of travel) that originate or end at some of the sites and visit some of the places, as specified by arbitrary route specifications (a route specification was called a commute path in earlier sections) involving the sites and the places. The searching or comparing may use any variant described in Section 4.9. Thus the method may respond with routes or route lengths, or their representation. Information computed by one embodiment of the method can be used, recursively, as an input to any embodiment of the method.

4.11 Computer System

Figure 11:
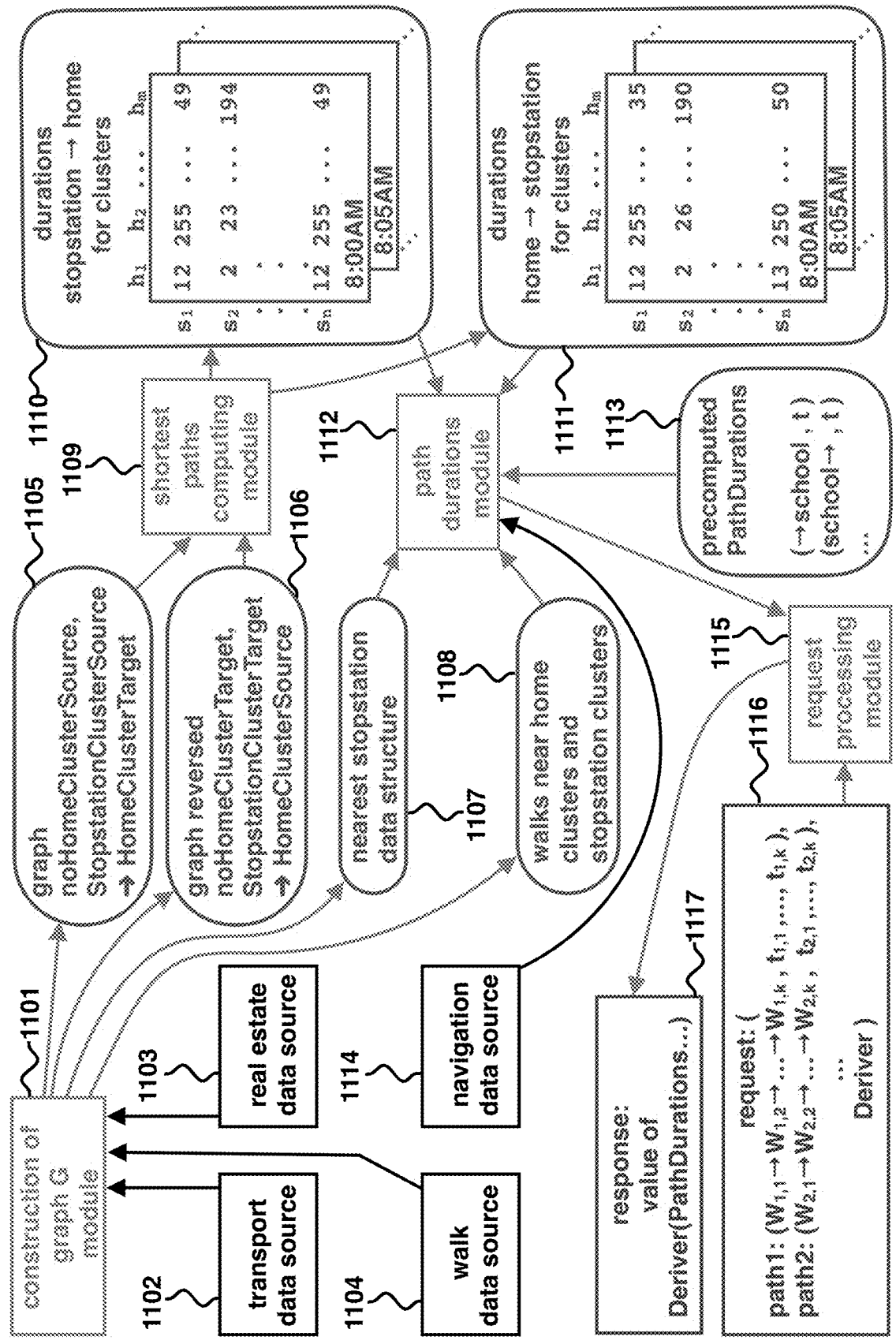
FIG. 11: depicts an example flowchart of a computer system according to an embodiment of the invention, legend: "An example flowchart of a computer system for: precomputing and storing data in a database, and processing requests using data retrieved from the database."

One of the embodiments of the invention is a computer system that searches or compares real estate properties using commutes. We illustrate an embodiment of the computer system in FIG. 11.

We use the term "module" in our description. It is known in the art that the term means a computer (sub)system that provides some specific functionality. Our choice of partitioning the computer system into the specific modules is exemplary, not mandatory. Those of ordinary skill in the art will notice that the system can be organized into modules in other manner without departing from the scope of the invention.

In one embodiment, each travel along any commute path has a specific departure time.

One module (1101) of the system reads data about the transportation system from a data source (1102), and constructs the graph G. During the construction, the module retrieves data about homes from a real estate data source (1103), and retrieves from other data source (1104) shortest walks between and near home clusters and stopstation clusters. The graph G contains timing data about vehicles. The module outputs the graph without any HOME_CLUSTER_SOURCE_$s$ vertexes (1105), and also outputs the graph without any HOME_CLUSTER_TARGET_$s$ vertexes but with reversed edges (1106). The module also builds a nearest neighbor data structure (1107) that can find stopstations within a threshold distance from any given geographical location, and precomputes shortest walks near home clusters and stopstation clusters (1108).

In the meantime, other module (1109) of the system reads the two graphs, and computes shortest graph paths. The module considers a range of times during the day, in one embodiment every 5 minutes. For each departure time, the module generates one table (1110) with shortest travel durations from stopstation clusters to home clusters using (1105), and the other table (1111) with shortest travel durations from home clusters to stopstation clusters using (1106). In one embodiment, each travel duration, rounded to the nearest minute, is stored as the unit 8_t type of the C++ programming language, with the maximum value of 255 reserved to denote an unknown or too large travel duration. In one embodiment, the tables are laid out on HDD disks in the row-major order. In one embodiment, the system uses a cache hierarchy involving HDD disks, SSD disks, and the main memory. In one embodiment, the tables or their parts are compressed using any compression algorithm, for example delta compression. We observe that for any pair comprising a home cluster and a stopstation cluster, travel durations are often similar during a period of time. This similarity often also holds in a neighborhood of the pair. In one embodiment, we select the sequence $h_1, \ldots, h_m$ of home clusters so that any $h_i$ and $h_{i+1}$ that are adjacent in the sequence often are nearby home clusters, or select the sequence $s_1, \ldots, s_n$ of stopstation clusters so that any $s_i$ and $s_{i+1}$ that are adjacent in the sequence often are nearby stopstation clusters.

The modules (1101) and (1109) operate continuously. As a result, the system maintains fresh data about travel durations given departure times.

Concurrently, a path durations module (1112) computes PathDurations. Given a commute path with departure times, the module queries (1113) for any relevant PathDurations that has already been precomputed. Any missing one is computed from scratch: the module queries a navigation data source (1114) to compute the PathNonHomeDuration of the part of the commute path that does not involve any home. The module also computes the travel durations PathFromHomeDurations and PathToHomeDurations that involve homes, by querying the nearest stopstations (1107), walks (1108), and home travel duration vectors (1110 and 1111) at the departure times.

Concurrently, the request processing module (1115) searches or compares real estate properties. Any request (1116) contains commute paths including geographical locations along the commute paths and departure times, and a Deriver. When a request is received from a user, the module retrieves PathDurations from the path durations module (1112), applies the Deriver, and responds to the user with information representing an output of the Deriver (1117).

Aspects of the invention may take form of a hardware embodiment, a software embodiment, or a combination of the two. Steps of the invention, for example blocks of any flowchart, may be executed out of order, partially concurrently or served from a cache, depending on functionality or optimization. Aspects may take form of a sequential system, or parallel/distributed system, where each component embodies some aspect, possibly redundantly with other components, and components may communicate, for example using a network of any kind. The invention is not described with reference to any specific programming language. A computer program carrying out operations for aspects of the invention may be written in any programming language, for example C++, Java, or JavaScript. Any program may execute on an arbitrary hardware platform, for example a Central Processing Unit (CPU) or a Graphics Processing Unit (GPU), and associated memory or storage devices. A program may execute aspects of the invention on one or more software platforms, including, but not limited to: a smartphone running Android or iOS operating systems, or a web browser, for example Firefox, Chrome, Internet Explorer, or Safari.

4.12 Computer Service

One of the embodiments of the invention is a computer service for searching or comparing real estate properties using commutes. The service is available to users through a user-accessed device, for example a smartphone application or a webpage. It will be obvious to anyone of ordinary skill in the art that the invention is not limited to these devices. It will also be obvious that the presentation of the service in our drawings can be modified (for example by rearranging, resizing, changing colors, shape, adding or removing components) without departing from the scope of the invention.

Figure 12:
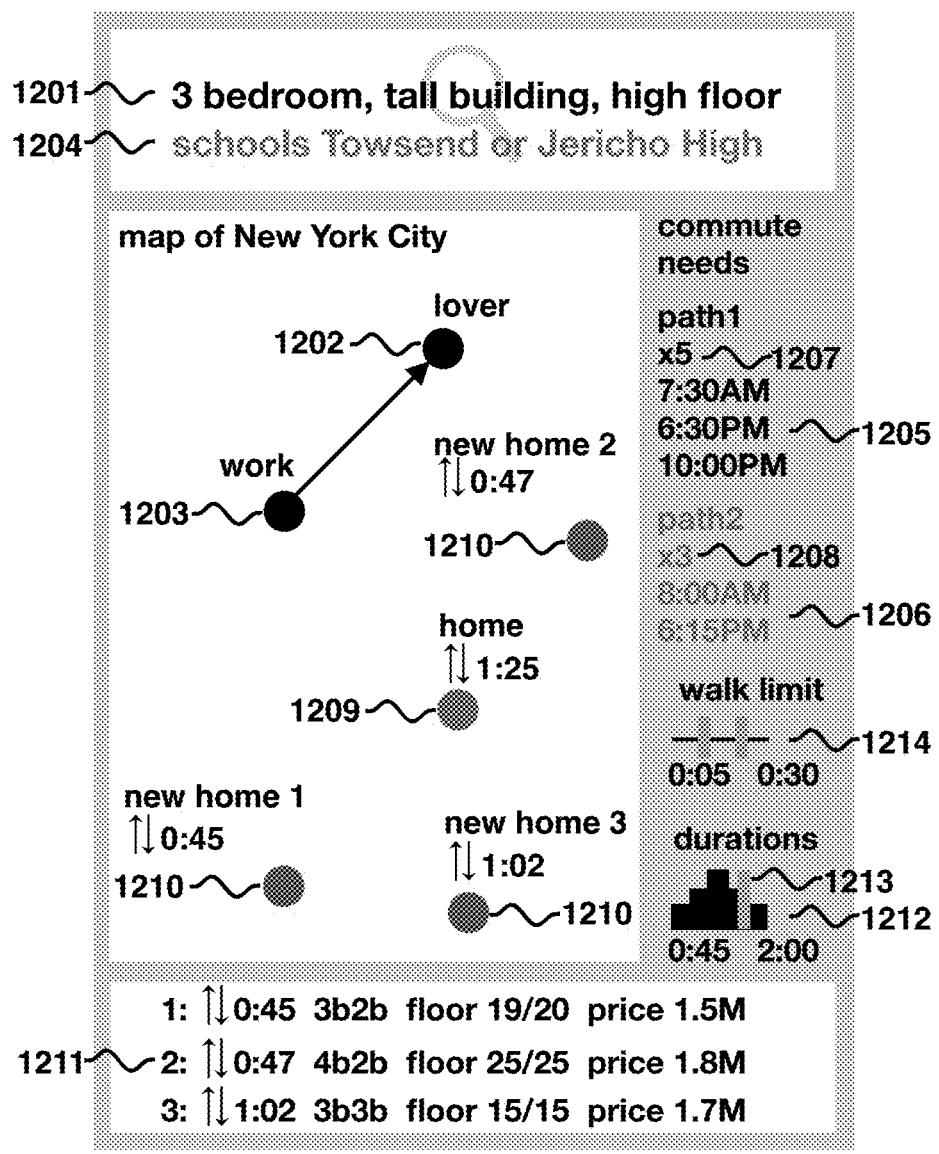
FIG. 12: depicts an example user request and a response by a computer service on a smartphone of the user according to an embodiment of the invention, legend: "An example user request and a response by a computer service on a smartphone of the user.".

In one embodiment, the service is accessed through a smartphone application. See FIG. 12 for an illustration. The user inputs a request. In one embodiment, the request includes:

the desired features of a real estate property (1201), for example "3 bedroom, tall building, high floor";

the commute paths (1202, 1203, "schools Towsend or Jericho High" 1204), departure times (1205, 1206), and the frequency of each commute path (1207, 1208); and the geographical location of the current home (1209) of the user.

In response, the service returns information representing travel durations. For example, the service renders geographical locations of real estate properties that match the user request (1210). The service renders how the travel durations from these real estate properties compare to the travel duration from the current home. The service renders a summary about each matching real estate property, for example its price. The real estate properties may be stacked on a 2D map, so that a real estate property with a lower travel duration appears above these real estate properties with higher travel durations. When there is clutter on a map, the service may instead render a cluster of real estate properties, the size of which is correlated with the number of real estate properties in the cluster. The cluster may display a summary, for example the number, or typical features of the real estate properties in the cluster.

In one embodiment, the service renders real estate properties with the shortest travel durations. Summaries of the real estate properties are also rendered (1211). The real estate properties may be sorted by the travel duration.

In one embodiment, the service renders a "heatmap" that uses a color to indicate a travel duration from each region of a metropolitan area, for example a minimum for the region, see FIG. 1 for an illustration. A heatmap may depict a difference between a travel duration for any home and the travel duration for the current home of the user. In one embodiment, a heatmap renders only the real estate properties that match the user-desired features of a real estate property.

In one embodiment, the service renders a histogram of travel durations (1212). The histogram has the travel duration on one axis, and on the other axis the fraction of real estate properties that yield this travel duration. In one embodiment, a histogram renders only the real estate properties that match the user-desired features of a real estate property. In one embodiment, the user can scroll (1213) through a histogram to any section of the histogram, and the service renders results for travel durations of this specific section. In one embodiment, the method uses other form of a histogram, for example a pie chart.

In one embodiment, the user may restrict the travel paths, for example by limiting a total walk duration, a number of transfers, etc., for example using range sliders (1214).

In one embodiment, the service renders a summary of a travel path for a real estate property.

In one embodiment, the service responds to the user with at least one of:

(a) a geographical location of: a place, or a site, rendered on a map;

(b) a departure time or an arrival time for: a place, or a site;

(c) a summary of a site; a summary may include at least one of: a name or an address of the site, a price of the site, or a size of the site;

(d) a summary of sites that form a cluster of nearby sites;

(e) a rendering of the cluster of nearby sites, a size of the rendering being correlated with a number of sites in the cluster of nearby sites;

(f) a stacking of sites in a z-index order of a route length, shorter route length higher up the stacking, rendered on a map;

(g) information about a route or route length; information may include at least one of: (i) a route: length, duration, monetary cost, speed, or wait duration; (ii) a name of: a vehicle, a vehicle road, a walking path, a stop, a turn, or a transit station of a public transportation vehicle; or (iii) a geographical location of: a monetary cost, a speed, a wait duration, a vehicle, a vehicle road, a walking path, a stop, a turn, or a transit station of a public transportation vehicle;

(h) a histogram of a route length across the sites; or a heatmap of a route length across the sites rendered on a map;

(i) a minimum route length; a histogram of a minimum route length across the sites; or a heatmap of a minimum route length across the sites rendered on a map;

(j) a weighted route length; a histogram of a weighted route length across the sites; or a heatmap of a weighted route length across the sites rendered on a map;
(k) a difference route length; a histogram of a difference route length across the sites; or a heatmap of a difference route length across the sites rendered on a map;
(l) a rendering of an output returned by the Deriver;
(m) a site that minimizes a route length across the sites, under a limit on a monetary cost of travel;
(n) one of the above items (a) to (m) constrained by a condition specified by a user; or
(o) a top list of sites, from among these sites, routes, and route lengths that satisfy the condition, sorted by a route length.

4.13 Claims

Those of ordinary skill in the art shall notice that various modifications may be made, and substitutions may be made with essentially equivalents, without departing from the scope of the present invention. Besides, a specific situation may be adapted to the teachings of the invention without departing from its scope. Therefore, despite the fact that the invention has been described with reference to the disclosed embodiments, the invention shall not be restricted to these embodiments. Rather, the invention will include all embodiments that fall within the scope of the appended claims.

4.14 Glossary

We include a glossary of selected phrases that occur in the claims, and example references to the specification. These references are not intended to be exhaustive; other references exist. The selected phrases follow the order in which the phrases first appear in the claims.

The claims also use the following phrases, whose meaning we explain:
1. a phrase "at least one A" is equivalent to "$\#_A \geq 1$, wherein $\#_A$ is a number of A";
2. a phrase "one or more A" is equivalent to "$\#_A \geq 1$, wherein $\#_A$ is a number of A";
3. a phrase "plurality of As" is equivalent to "$\#_A \geq 2$, wherein $\#_A$ is a number of A";
4. a phrase "at least two As" is equivalent to "$\#_A \geq 2$, wherein $\#_A$ is a number of A";
5. a phrase "one of: A, or B" is equivalent to "$\#_A + \#_B = 1$, wherein $\#_A$ is a number of A, and $\#_B$ is a number of B";
6. a phrase "at least one of: A, or B" is equivalent to "$\#_A + \#_B \geq 1$, wherein $\#_A$ is a number of A, and $\#_B$ is a number of B"; and
7. a phrase "at least one B or C" is equivalent to "at least one A, wherein each A is (B or C)".

| phrase | example reference |
| --- | --- |
| method | paragraph [003] |
| searching or comparing | paragraph [002] |
| site | paragraph [148] |
| route or route length | paragraphs [013], [127] |
| place | paragraph [148] |
| transportation system | paragraph [022] |
| representative | paragraphs [022], [117] |
| storing | paragraph [022] |
| database | paragraph [022] |
| precomputed | Section 4.4 |
| description of travel | paragraph [020] |
| receiving | paragraph [003] |
| request | paragraph [022] |
| start place | Section 4.5.2 |
| end place | Section 4.5.3 |
| computing | paragraph [089] |
| nearby representative | paragraphs [068], [120], [121] |
| length of travel | paragraph [020] |
| threshold | paragraph [035] |
| retrieving | paragraph [022] |
| not nearby site | paragraph [068] |
| responding | paragraph [003] |
| information | paragraph [003] |
| representation | paragraph [148] |
| real estate property/commute destination | paragraph [002] |
| departure time/arrival deadline | paragraphs [066], [090] |
| place $P_i$, start place $P_1$, end place $P_k$ | Definition 1 |
| first site, last site | Section 4.9.7 |
| involves | Section 4.9.7 |
| site-place route or route length | paragraph [091] |
| cluster site/cluster representative | paragraphs [035], [036] |
| site connector | paragraph [112] |
| compression | paragraph [153] |
| manipulation function | paragraph [093] |
| zone | paragraph [092] |
| transportation elements | paragraph [127] |
| segment length | paragraph [033] |
| graph/graph vertexes | paragraph [033] |
| transportation element vertexes | Section 4.9.3 |
| site vertex/representative vertex | paragraph [117] |
| graph edge | paragraph [033] |
| graph edge source vertex/graph edge target vertex/graph edge weight | paragraph [033] |
| graph path or graph path length | paragraph [033] |
| time | paragraph [042] |
| algorithm | paragraph [033] |
| reversed | paragraph [040] |
| coordinate | paragraph [056] |
| vector v, value v[i] | paragraph [056] |
| vector v', value v'[i] | paragraph [058] |
| laying out | paragraph [153] |
| list/hash map | paragraphs [062], [063] |
| weight $w_i$ | paragraph [059] |
| lower bound $lb_i$, upper bound $ub_i$, scaling factor $sf_i$ | paragraph [060] |
| +operation, min operation | paragraph [072] |
| first mathematical formula/second mathematical formula | paragraphs [072], [086] |
| partitions | paragraph [075] |
| route specification $L_i$ | paragraphs [028], [148] |
| deriver | paragraph [109] |
| minimum route length | Section 4.6.2 |
| weights $w_1, \ldots, w_q$ | paragraph [099] |
| weighted route length | Section 4.6.1 |
| site S | paragraph [105] |
| difference route length | Section 4.7.1 |
| condition | Sections 4.9.4, 4.9.5 |
| filtering | paragraph [006], Sections 4.9.4, 4.9.5 |
| aggregator | paragraph [131] |
| centrality | paragraph [131] |
| cost function | paragraph [140] |
| exploration algorithm | Section 4.9.8 |
| differentiable function | paragraph [140] |
| gradient descent | paragraph [140] |
| multi-objective optimization/ multi-dimensional cost | paragraphs [050], [147] |
| computer system | Section 4.11 |
| apparatus | Section 4.12 |
| summary/rendering/stacking | paragraph [160] |
| heatmap | paragraph [162] |
| histogram | paragraph [163] |
| top list | paragraph [109] |

The invention claimed is:
1. A method for searching or comparing at least one site using at least one description of travel between the at least one site and at least one place within a transportation system, the method comprising:

(a) receiving at least one representative included in the transportation system, wherein each representative corresponds to a vertex of a graph that models the transportation system, and wherein a number of representatives is at most a number of vertexes of the graph multiplied by a predetermined ratio;

(b) receiving a request comprising the at least one place; and (c) responding to the request with information obtained using the at least one description of travel;

the method characterized by:

(d) determining at least one precomputed description of travel and storing it in a database, wherein each first precomputed description of travel describes travel within the transportation system between a first site included in the at least one site and a first representative included in the at least one representative; and (e) computing the at least one description of travel that comprises a description of travel within the transportation system between an endpoint site included in the at least one site and an endpoint place included in the at least one place, wherein the endpoint site or the endpoint place is not included in the at least one representative, and wherein the computing comprises:

i. determining at least one nearby representative included in the at least one representative, wherein a length of travel between each nearby representative and the endpoint place is within a first threshold;

ii. retrieving from the at least one precomputed description of travel a second precomputed description of travel between the endpoint site and the nearby representative; and iii. determining a description of travel within the transportation system between the nearby representative and the endpoint place.

2. A computer system for searching or comparing at least one site using at least one description of travel between the at least one site and at least one place within a transportation system, the computer system comprising:

(a) one or more processors;

(b) a non-transitory computer-readable storage medium storing one or more programs for execution by the one or more processors; and (c) the one or more programs comprising instructions to be executed by the one or more processors so as to perform at least one step;

wherein the at least one step comprises:

(d) receiving at least one representative included in the transportation system, wherein each representative corresponds to a vertex of a graph that models the transportation system, and wherein a number of representatives is at most a number of vertexes of the graph multiplied by a predetermined ratio;

(e) receiving a request comprising the at least one place; and (f) responding to the request with information obtained using the at least one description of travel;

the computer system characterized by the at least one step further comprising:

(g) determining at least one precomputed description of travel and storing it in a database, wherein each first precomputed description of travel describes travel within the transportation system between a first site included in the at least one site and a first representative included in the at least one representative; and (h) computing the at least one description of travel that comprises a description of travel within the transportation system between an endpoint site included in the at least one site and an endpoint place included in the at least one place, wherein the endpoint site or the endpoint place is not included in the at least one representative, and wherein the computing comprises:

i. determining at least one nearby representative included in the at least one representative, wherein a length of travel between each nearby representative and the endpoint place is within a first threshold;

ii. retrieving from the at least one precomputed description of travel a second precomputed description of travel between the endpoint site and the nearby representative; and iii. determining a description of travel within the transportation system between the nearby representative and the endpoint place.

3. An apparatus for searching or comparing at least one site using at least one description of travel between the at least one site and at least one place within a transportation system, the apparatus comprising sets of instructions configured to perform at least one step comprising:

(a) receiving at least one representative included in the transportation system, wherein each representative corresponds to a vertex of a graph that models the transportation system, and wherein a number of representatives is at most a number of vertexes of the graph multiplied by a predetermined ratio;

(b) receiving a request comprising the at least one place; and (c) responding to the request with information obtained using the at least one description of travel;

the apparatus further comprising a user-accessed device comprising:

(d) a receiver configured to receive from a user the request; and (e) a transmitter configured to respond to the user with the information;

the apparatus characterized by the at least one step further comprising:

(f) determining at least one precomputed description of travel and storing it in a database, wherein each first precomputed description of travel describes travel within the transportation system between a first site included in the at least one site and a first representative included in the at least one representative; and (g) computing the at least one description of travel that comprises a description of travel within the transportation system between an endpoint site included in the at least one site and an endpoint place included in the at least one place, wherein the endpoint site or the endpoint place is not included in the at least one representative, and wherein the computing comprises:

i. determining at least one nearby representative included in the at least one representative, wherein a length of travel between each nearby representative and the endpoint place is within a first threshold;

ii. retrieving from the at least one precomputed description of travel a second precomputed description of travel between the endpoint site and the nearby representative; and iii. determining a description of travel within the transportation system between the nearby representative and the endpoint place.

4. A method for searching or comparing at least one site using at least one route between the at least one site and at least one place within a transportation system, the method comprising:
 (a) receiving at least one representative included in the transportation system, wherein each representative corresponds to a vertex of a graph that models the transportation system, and wherein a number of representatives is at most a number of vertexes of the graph multiplied by a predetermined ratio;
 (b) receiving a request comprising the at least one place from a user; and
 (c) responding to the request to the user with information obtained using the at least one route;
the method characterized by:
 (d) determining at least one precomputed complete route and storing it in a database, wherein each first precomputed complete route describes travel within the transportation system between a first site included in the at least one site and a first representative included in the at least one representative; and
 (e) computing the at least one route that comprises a route within the transportation system between an endpoint site included in the at least one site and an endpoint place included in the at least one place,
  wherein the endpoint site or the endpoint place is not included in the at least one representative, and
  wherein the computing comprises:
   i. determining at least one nearby representative included in the at least one representative, wherein a length of travel between each nearby representative and the endpoint place is within a first threshold;
   ii. retrieving from the at least one precomputed complete route a second precomputed complete route between the endpoint site and the nearby representative; and
   iii. determining a route within the transportation system between the nearby representative and the endpoint place.

\* \* \* \* \*